US010354055B2

(12) United States Patent
Taniguchi

(10) Patent No.: US 10,354,055 B2
(45) Date of Patent: Jul. 16, 2019

(54) PORTABLE ELECTRONIC DEVICE AND SYSTEM

(71) Applicant: Kabushiki Kaisha Toshiba, Minato-ku (JP)

(72) Inventor: Keita Taniguchi, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 197 days.

(21) Appl. No.: 15/015,570

(22) Filed: Feb. 4, 2016

(65) Prior Publication Data

US 2016/0267262 A1    Sep. 15, 2016

(30) Foreign Application Priority Data

Mar. 10, 2015   (JP) ................................ 2015-047066

(51) Int. Cl.
| G06F 21/32 | (2013.01) |
| G06F 21/77 | (2013.01) |
| H04L 9/32  | (2006.01) |
| G06F 21/31 | (2013.01) |

(52) U.S. Cl.
CPC ............. *G06F 21/32* (2013.01); *G06F 21/31* (2013.01); *G06F 21/77* (2013.01); *H04L 9/3231* (2013.01); *H04L 9/3234* (2013.01)

(58) Field of Classification Search
CPC .......... G06F 21/32; G06F 21/31; G06F 21/77; H04L 9/3234; H04L 9/3231
See application file for complete search history.

(56) References Cited

U.S. PATENT DOCUMENTS

| 4,993,068 A    | * | 2/1991  | Piosenka | G06F 21/32 |
|                |   |         |          | 235/380 |
| 7,610,492 B2   | * | 10/2009 | Awatsu   | G06F 21/32 |
|                |   |         |          | 713/185 |
| 2001/0017584 A1| * | 8/2001  | Shinzaki | G06F 21/32 |
|                |   |         |          | 340/5.52 |

(Continued)

FOREIGN PATENT DOCUMENTS

| EP | 1 237 091 A1 | 9/2002 |
| JP | 11-025246    | 1/1999 |

(Continued)

OTHER PUBLICATIONS

Singaporean Search Report and Written Opinion dated Jul. 11, 2016 in Patent Application No. 10201600831X.

(Continued)

*Primary Examiner* — Joseph P Hirl
*Assistant Examiner* — J. Brant Murphy
(74) *Attorney, Agent, or Firm* — Oblon, McClelland, Maier & Neustadt L.L.P.

(57) ABSTRACT

A portable electronic device includes a biometric information obtaining unit and an authentication information generating unit. The biometric information obtaining unit obtains biometric information that represents a physical feature of a user of the portable electronic device. The authentication information generating unit generates authentication information that is numerical information for authentication of the user having a predetermined number of digits, based on the biometric information that has been obtained by the biometric information obtaining unit.

5 Claims, 20 Drawing Sheets

(56) References Cited

U.S. PATENT DOCUMENTS

| | | | | |
|---|---|---|---|---|
| 2003/0005310 A1* | 1/2003 | Shinzaki | ............ | G06F 21/32 |
| | | | | 713/186 |
| 2003/0156011 A1* | 8/2003 | Modl | ............ | G06K 9/00 |
| | | | | 340/5.82 |
| 2003/0229598 A1* | 12/2003 | de Jong | ............ | G06F 21/31 |
| | | | | 705/72 |
| 2005/0144484 A1* | 6/2005 | Wakayama | ............ | G06F 21/31 |
| | | | | 726/19 |
| 2006/0080550 A1* | 4/2006 | Awatsu | ............ | G06F 21/32 |
| | | | | 713/186 |
| 2006/0226951 A1* | 10/2006 | Aull | ............ | G06F 21/32 |
| | | | | 340/5.61 |
| 2007/0195998 A1* | 8/2007 | Le Saint | ............ | G06F 21/32 |
| | | | | 382/115 |
| 2014/0365782 A1* | 12/2014 | Beatson | ............ | G06F 21/32 |
| | | | | 713/186 |

FOREIGN PATENT DOCUMENTS

| | | |
|---|---|---|
| JP | 2004-310667 | 11/2004 |
| JP | 2007-012040 A | 1/2007 |
| WO | WO 01/42938 A1 | 6/2001 |

OTHER PUBLICATIONS

Office Action dated Jul. 3, 2018, in Japanese Patent Application No. 2015-047066, filed Mar. 10, 2015.

\* cited by examiner

| CARD ID | ACCOUNT NO. | PIN | . . . |
|---|---|---|---|
| 000001 | 123-4567890 | 1234 | . . . |
| 000002 | 122-3456789 | 5678 | . . . |
| . . . | . . . | . . . | . . . |

# PORTABLE ELECTRONIC DEVICE AND SYSTEM

CROSS-REFERENCE TO RELATED APPLICATION

This application is based upon and claims the benefit of priority from the prior Japanese Patent Application No. 2015-047066, filed on Mar. 10, 2015, the entire contents of which are incorporated herein by reference.

FIELD

Embodiments of the present invention relate to a portable electronic device and a system.

BACKGROUND

In recent years, portable electronic devices such as IC cards with a built-in IC (Integrated Circuit) chip have been commonly used. Systems that use a conventional portable electronic device authenticate the legitimacy of the owner of the portable electronic device by using secret authentication information such as a PIN (Personal Identification Number). However, if the PIN is leaked (divulged), there is the possibility of unauthorized use of the system by a third party who disguises itself as the owner of the portable electronic device, and the security of the system may be degraded.

DETAILED DESCRIPTION

A portable electronic device according to embodiments includes a biometric information obtaining unit and an authentication information generating unit. The biometric information obtaining unit obtains biometric information that represents a physical feature of a user of the portable electronic device. The authentication information generating unit generates authentication information that is numerical information for authentication of the user having a predetermined number of digits, based on the biometric information that has been obtained by the biometric information obtaining unit.

The following describes portable electronic devices and systems according to embodiments with reference to the drawings.

First Embodiment

Figures 1, 2:
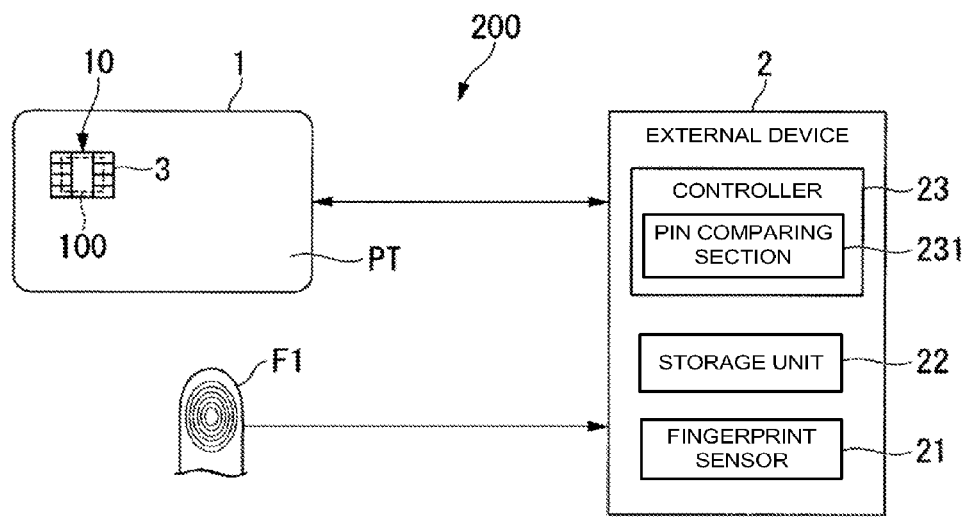
FIG. 1 is a block diagram showing an IC card system according to a first embodiment.
FIG. 2 is a diagram showing an example of data stored in a storage unit of an external device according to the first embodiment.

FIG. 1 is a block diagram showing an IC card system according to a first embodiment.

As shown in FIG. 1, an IC card system 200 includes an IC card 1 and an external device 2. In the present embodiment, the IC card 1 is used as an example of a portable electronic device. When using the IC card system 200, an IC card user connects his own IC card 1 to the external device 2.

In the IC card system 200 according to the present embodiment, the IC card 1 generates a PIN (Personal Identification Number) for authentication of the user of the IC card 1, based on the fingerprint information of the user of the IC card 1, and the external device 2 performs authentication to determine whether or not the user of the IC card 1 is the legitimate card owner (card holder), based on the generated PIN. In the present embodiment, an example is described in which fingerprint information is used as an example of biometric information that represents a physical feature of a human. Here, the fingerprint information is image information that indicates the shape of a fingerprint, for example.

The IC card 1 has a card base member PT (an example of a card body) that is made of plastic, and an IC module 10 that is mounted on the card base member PT, for example. The IC module 10 includes a contact unit 3 and an IC chip 100. The IC card 1 can communicate with the external device 2 via the contact unit 3. The IC card 1 receives, via the contact unit 3, a command that has been transmitted by the external device 2, and performs a process that is in accordance with the received command. Then, the IC card 1 transmits a response that is the result of execution of the process, to the external device 2 via the contact unit 3.

The IC module 10 is traded in the form of a COT (Chip On Tape) in which a plurality of IC modules 10 are disposed on a tape, for example.

The contact unit 3 has terminals for receiving certain kinds of signals that are necessary for the IC card 1 to operate. Here, the terminals for receiving certain kinds of signals include terminals for receiving power supply voltage, a clock signal, a reset signal, and the like that are supplied from the external device 2, and a serial data input/output terminal (SIO terminal) for communication with the external device 2. The terminals for receiving the supplied signals from the external device 2 include power supply terminals (VDD terminal and GND terminal), a clock signal terminal (CLK terminal), and a reset signal terminal (RST terminal).

The IC chip 100 is an LSI (Large Scale Integration) element such as a single-chip microprocessor, for example.

The details of the hardware configuration of the IC card 1 are described below.

The external device 2 is a higher-level device (or host) that communicates with the IC card 1. For example, the external device 2 is a terminal device such as an ATM (Automated Teller Machine) that includes a reader/writer device. The external device 2 includes a fingerprint sensor 21, a storage unit 22, and a control unit 23, for example.

The fingerprint sensor 21 is an example of a biometric information detecting unit, and detects the fingerprint information of a finger F1 of the user of the IC card 1. The fingerprint sensor 21 has a camera that includes a CCD (Charge Coupled Device) image sensor or a CMOS image sensor, and detects fingerprint information based on an image that indicates the shape of the fingerprint that has been captured by the camera, for example. The camera is an image capturing unit. Note that instead of an optical sensor that has a camera, the fingerprint sensor 21 may also be an electrostatic sensor that obtains an image that indicates the shape of the fingerprint based on differences in the amount of charge that is generated when the finger F1 is pressed against the sensor, or an electric field sensor that obtains an image that indicates the shape of the fingerprint based on changes in the electric field.

The storage unit 22 stores therein information that is used for certain processes performed by the external device 2. For example, as shown in FIG. 2, the storage unit 22 pre-stores therein authentication information that is used for authentication of the user of the IC card 1. FIG. 2 is a diagram showing an example of the data stored in the storage unit 22 of the external device 2 according to the present embodiment. As shown in FIG. 2, the storage unit 22 stores therein a "card ID", an "account number", and a "PIN" that are associated with each other.

Here, "card ID" is the ID number (identification information) of the IC card 1 or the owner of the IC card 1, for example, and "account number" is an example of a PAN (Primary Account Number), for example. In the present embodiment, the account number indicates a bank account number, for example. "PIN" is personal authentication information that is four-digit numerical information, for example. Note that the authentication information in the present embodiment includes "card ID", "account number", and "PIN".

The example shown in FIG. 2 indicates that "000001" under "card ID" corresponds to "123-4567890" under "account number" and to "1234" under "PIN", for example.

Note that the PIN stored in the storage unit 22 has been generated from the fingerprint information of the owner of the IC card 1 in advance by the same method as the method employed by the IC card 1.

The following is a continuation of the description of FIG. 1. The control unit 23 is a processor that includes a CPU (Central Processing Unit) or the like, and has comprehensive control over the external device 2, for example. The control unit 23 incorporates fingerprint information that has been detected by the fingerprint sensor 21 into a PIN generation command, and transmits the command to the IC card 1, for example. The control unit 23 determines the legitimacy of the user of the IC card 1, based on the authentication information that has been received from the IC card 1 as a response, for example. That is, the control unit 23 determines whether or not the user of the IC card 1 is the legitimate owner of the IC card 1.

Furthermore, the control unit 23 includes a PIN comparing unit 231.

The PIN comparing unit 231 is an example of a determination unit, and determines the legitimacy of the user of the IC card 1, based on the PIN that has been output from the IC card 1. That is, the PIN comparing unit 231 receives the card ID, the account number (PAN), the PIN, and the like as the authentication information, and compares the received PIN with the PIN that corresponds to the received card ID and the received account number (PAN). Specifically, the PIN comparing unit 231 reads out the PIN that corresponds to the received card ID and the received account number (PAN) from the storage unit 22. The PIN comparing unit 231 determines the legitimacy of the user of the IC card 1 according to whether or not the read PIN matches the received PIN. For example, if the read PIN matches the received PIN, the PIN comparing unit 231 determines that the user of the IC card 1 whose fingerprint information has been detected is the legitimate owner of the IC card 1.

Figure 3:
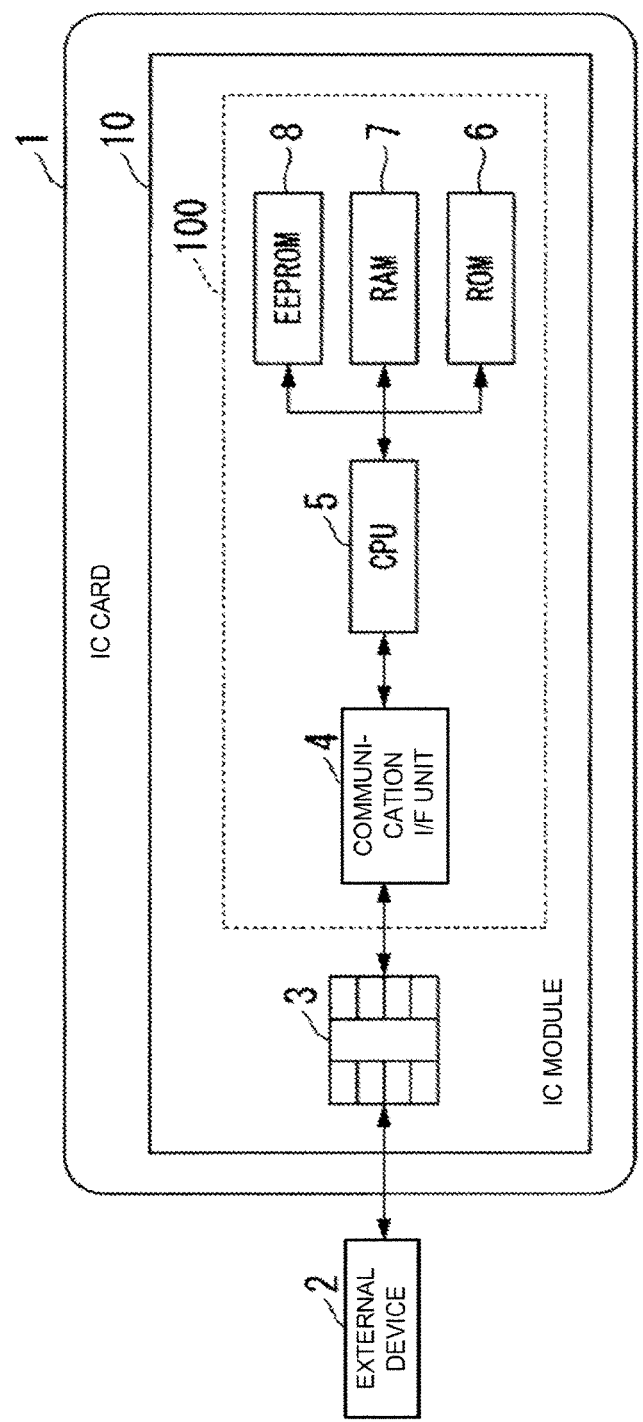
FIG. 3 is a diagram showing an example of a hardware configuration of an IC card according to the first embodiment.

Next, a description is given of the hardware configuration of the IC card 1 according to the present embodiment with reference to FIG. 3.

FIG. 3 is a diagram showing an example of the hardware configuration of the IC card 1 according to the present embodiment.

As shown in FIG. 3, the IC card 1 includes the IC module 10 that includes the contact unit 3 and the IC chip 100. The IC chip 100 includes a communication I/F (Interface) unit 4, a CPU 5, a ROM (Read Only Memory) 6, a RAM (Random Access Memory) 7, and an EEPROM (Electrically Erasable Programmable ROM) 8.

The communication I/F unit 4 performs communication (i.e., transmission and reception of commands/responses) between the IC card 1 and the external device 2.

The CPU 5 performs certain processes for the IC card 1 by executing programs that are stored in memories such as the ROM 6 and the EEPROM 8. The CPU 5 executes a process that is in accordance with a command that has been received by the communication I/F unit 4 via the contact unit 3, for example.

The ROM 6 is a non-volatile memory such as a mask ROM, and stores therein programs that are used for execution of certain processes for the IC card 1, and data such as a command table, for example.

The RAM 7 is a volatile memory such as a SRAM (Static RAM), and temporarily stores therein data that is used for execution of certain processes for the IC card 1, for example.

The EEPROM 8 is an electrically rewritable non-volatile memory, for example. The EEPROM 8 stores therein certain kinds of data that is to be used by the IC card 1. The EEPROM 8 stores therein the card ID, the account number (PAN), and the like, for example.

Figure 4:
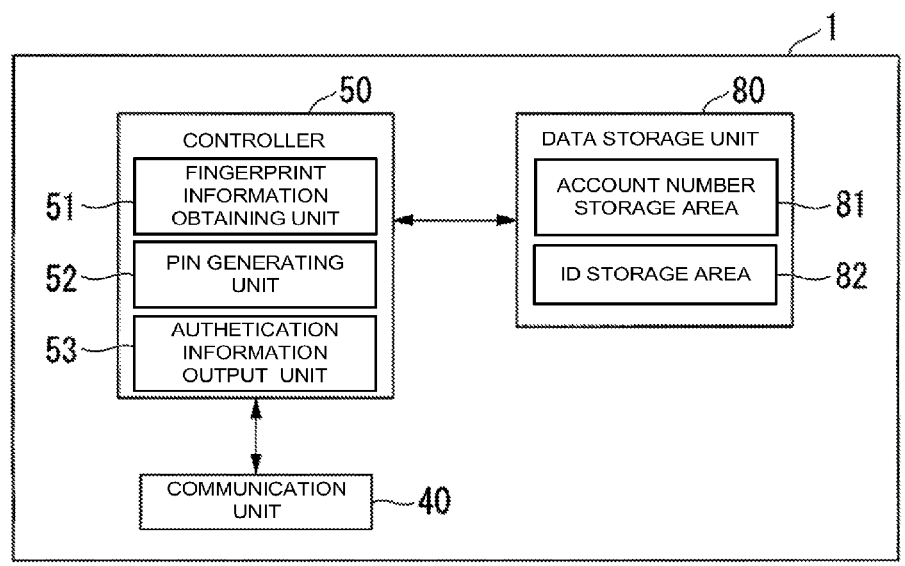
FIG. 4 is a block diagram showing an example of a functional configuration of the IC card according to the first embodiment.

Next, a description is given of an example of the functional configuration of the IC card 1 according to the present embodiment with reference to FIG. 4.

FIG. 4 is a block diagram showing an example of the functional configuration of the IC card 1 according to the present embodiment.

As shown in FIG. 4, the IC card 1 includes a communication unit 40, a control unit 50, and a data storage unit 80.

Here, each unit shown in FIG. 4 is realized by using the hardware shown in FIG. 3.

The data storage unit 80 is an example of a storage unit, and is constituted by the EEPROM 8, for example. The data storage unit 80 includes an account number storage area 81 and an ID storage area 82, for example.

The account number storage area 81 stores therein the account number (PAN) that corresponds to the IC card 1.

The ID storage area 82 stores therein the card ID (ID number) that corresponds to the IC card 1.

Here, it is assumed that the account number (PAN) and the card ID (ID number) have been stored in advance in the account number storage area 81 and the ID storage area 82, respectively. The account number (PAN) and the card ID (ID number) are used as part of the authentication information at the time of authentication of the user of the IC card 1.

The communication unit 40 is realized by the communication I/F unit 4, the CPU 5, and programs stored in the ROM 6, and performs transmission and reception of commands/responses with the external device 2 via the contact unit 3, for example.

The control unit 50 is realized by the CPU 5 and a memory such as any of the RAM 7, the ROM 6, and the EEPROM 8, or a combination of these memories, and has comprehensive control over the IC card 1, for example. The control unit 50 executes processes according to certain kinds of commands that have been transmitted from the external device 2 to the IC card 1, for example. The control unit 50 generates a PIN that is numerical information having a predetermined number of digits, based on fingerprint information, for example.

The control unit 50 includes a fingerprint information obtaining unit 51, a PIN generating unit 52, and an authentication information output unit 53, for example.

The fingerprint information obtaining unit 51 is an example of a biometric information obtaining unit, and obtains the fingerprint information of the user of the IC card 1. Fingerprint information is an example of biometric information that represents physical characteristics. The fingerprint information obtaining unit 51 receives, via the communication unit 40, fingerprint information that has been transmitted with a command from the external device 2, thereby obtaining the fingerprint information of the user of the IC card 1.

The PIN generating unit 52 is an example of an authentication information generating unit, and generates authentication information that is numerical information having a predetermined number of digits for authentication of the user of the IC card 1, based on the fingerprint information that has been obtained by the fingerprint information obtaining unit 51. The PIN generating unit 52 generates a four-digit PIN from the fingerprint information, based on a predetermined algorithm, for example. For example, the PIN generating unit 52 extracts feature values of the fingerprint from the fingerprint information. The PIN generating unit 52 generates a four-digit PIN based on all or some of the extracted feature values. The PIN generating unit 52 may generate a four-digit PIN based on the hash values of all or some of the feature values, for example.

Note that a PIN is authentication information that is used for checking the legitimacy of the user of the IC card 1, for example, and from the fingerprint information of the same person, the PIN generating unit 52 generates the same PIN each time.

The authentication information output unit 53 is an example of an output unit, and outputs authentication information to the external device 2 that determines the legitimacy of the user of the IC card 1 based on the PIN generated by the PIN generating unit 52. The authentication information output unit 53 outputs the card ID and the account number (PAN) that are stored in the EEPROM 8 (i.e., the data storage unit 80) and the PIN that have been generated by the PIN generating unit 52 to the external device 2 via the communication unit 40 as a response to the above-described command, for example. That is, the authentication information output unit 53 causes the communication unit 40 to transmit, as the authentication information, the card ID, the account number (PAN), and the generated PIN.

Figure 5:
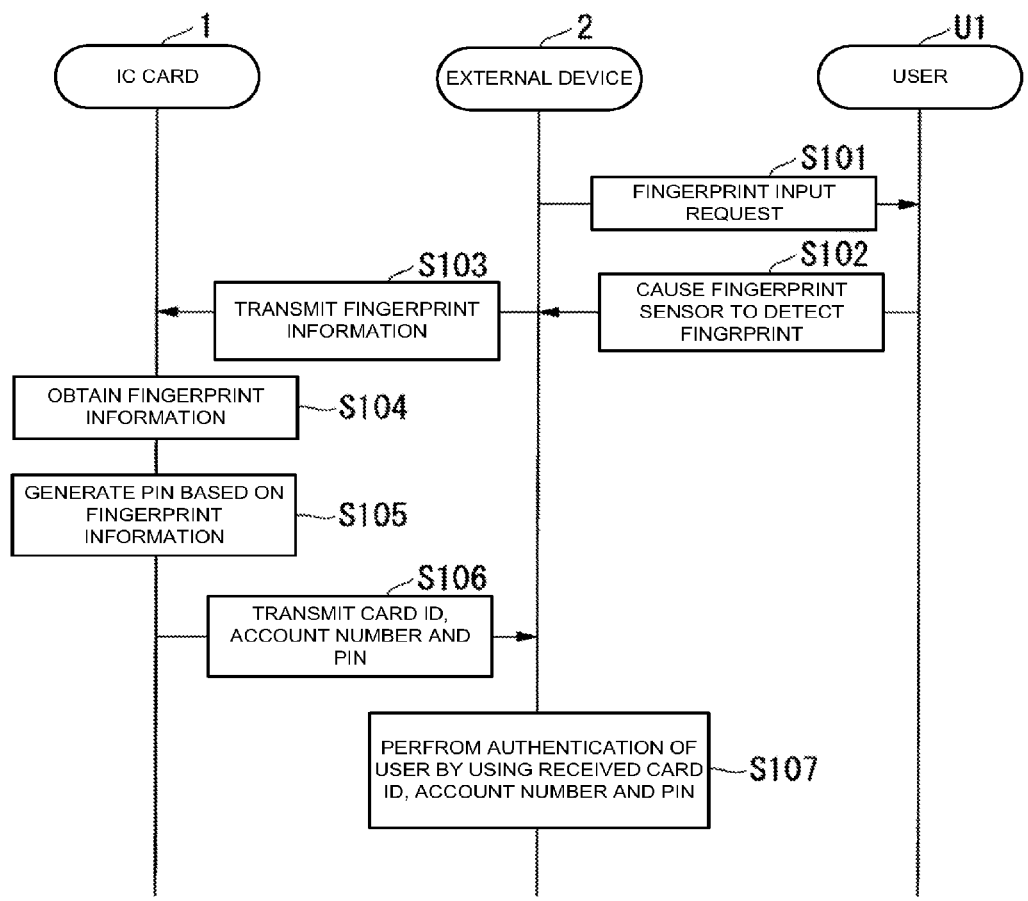
FIG. 5 is a diagram showing an example of an authentication process that is performed by the IC card system according to a first embodiment.

Next, a description is given of an authentication process performed by the IC card system 200 according to the present embodiment with reference to FIG. 5.

FIG. 5 is a diagram showing an example of the authentication process performed by the IC card system 200 according to the present embodiment.

Note that in the description of this drawing, it is assumed that the user of the IC card system 200 is a user U1.

In FIG. 5, first, the external device 2 outputs a fingerprint input request to the user U1 (step S101). That is, the control unit 23 of the external device 2 displays, on a display unit (not shown in the drawing) of the external device 2, a message that prompts the user U1 to input fingerprint information, for example.

Next, the user U1 causes the fingerprint sensor 21 to detect the fingerprint of the user U1 (step S102). That is, the user U1 runs the finger F1 over the fingerprint sensor 21 of the external device 2, and consequently the fingerprint sensor 21 detects the fingerprint information.

Next, the external device 2 transmits the fingerprint information detected by the fingerprint sensor 21 to the IC card 1 (step S103). That is, the control unit 23 of the external device 2 outputs a command that includes the fingerprint information to the IC card 1 as a command that causes the IC card 1 to generate a PIN.

Next, the IC card 1 obtains the fingerprint information (step S104). That is, the fingerprint information obtaining unit 51 of the IC card 1 obtains the fingerprint information that is included in the command received from the external device 2 via the communication unit 40.

Next, the IC card 1 generates a PIN based on the fingerprint information (step S105). That is, the PIN generating unit 52 of the IC card 1 generates a PIN that is four-digit numerical information for example, based on the fingerprint information that has been obtained by the fingerprint information obtaining unit 51. That is, the PIN generating unit 52 generates a PIN that is authentication information.

Next, the IC card 1 transmits the card ID, the account number (PAN), and the PIN to the external device 2 as authentication information (step S106). That is, the authentication information output unit 53 of the IC card 1 outputs the card ID and the account number (PAN) stored in the EEPROM 8 (i.e., the data storage unit 80) and the PIN generated by the PIN generating unit 52 to the external device 2 via the communication unit 40 as a response to the above-described command, for example.

Next, the external device 2 performs authentication of the user U1 by using the received authentication information, namely the card ID, the account number (PAN), and the PIN (step S107). That is, the PIN comparing unit 231 of the external device 2 reads out the PIN that corresponds to the received card ID and the received account number (PAN) from the storage unit 22. Then, the PIN comparing unit 231 determines whether or not the received PIN matches the PIN that has been read out from the storage unit 22. If the received PIN matches the PIN that has been read out from the storage unit 22, the PIN comparing unit 231 determines that the user U1 whose fingerprint information has been detected is the legitimate owner of the IC card 1. If this is the case, the external device 2 executes certain processes. If the received PIN does not match the PIN that has been read out from the storage unit 22, the PIN comparing unit 231 determines that the user U1 whose fingerprint information has been detected is not the legitimate owner of the IC card 1. If this is the case, the external device 2 does not execute the processes.

Note that in the above-described embodiment, a description has been given of an example in which a PIN is generated based on fingerprint information. However, it is also possible to generate an account number (PAN) or a card ID based on fingerprint information. In the above-described embodiment, the IC card 1 outputs both the card ID and the account number (PAN) to the external device 2 as part of the authentication information. However, in cases where the external device 2 can search for the PIN in the storage unit 22 by using at least one of the card ID and the account number (PAN), the IC card 1 may be configured to output just one of the card ID and the account number (PAN) to the external device 2. Also, although the IC card 1 in the above-described embodiment simultaneously outputs the card ID, the account number (PAN), and the generated PIN to the external device 2, the IC card 1 may output the generated PIN separately from the card ID and the account number (PAN) to the external device 2.

As described above, the IC card 1 according to the present embodiment includes the fingerprint information obtaining unit 51 as an example of a biometric information obtaining unit and the PIN generating unit 52 as an example of an authentication information generating unit. The fingerprint information obtaining unit 51 obtains biometric information (e.g., fingerprint information) that represents a physical feature of the user of the IC card 1 (e.g., the user U1, which is the user of the system). The PIN generating unit 52 generates a PIN that is numerical information having a predetermined number of digits (e.g., four digits) and that is authentication information for authentication of the user of the IC card 1, based on the fingerprint information that has been obtained by the fingerprint information obtaining unit 51.

Consequently, the IC card 1 according to the present embodiment generates a PIN each time based on the biometric information (e.g., the fingerprint information), and therefore the user of the IC card 1 does not need to input the PIN. Therefore, the possibility of the PIN leaking to a third party can be reduced. That is, the IC card 1 according to the present embodiment can reduce the possibility of unauthorized use of the system by a third party who disguises as the owner of the IC card 1. Therefore, the IC card 1 according to the present embodiment can improve the security of the system.

Also, with the IC card system 200 according to the present embodiment, the user of the IC card 1 does not need to remember the PIN, and due to the detection of the biometric information (e.g., the fingerprint information), the user can use the system without being aware of the PIN. That is, the IC card system 200 according to the present embodiment can be used without a complicated operation to input the PIN. Therefore, the IC card system 200 according to the present embodiment can improve convenience for the user of the system.

Also, the IC card 1 according to the present embodiment includes the authentication information output unit 53 that outputs the authentication information that includes the PIN generated by the PIN generating unit 52 to the external device 2 that determines the legitimacy of the user of the IC card 1. The authentication information output unit 53 is an example of an output unit.

Consequently, the PIN generated by the IC card 1 is input to the external device 2 instead of a PIN being input to the external device 2 by the user of the IC card 1. A personal authentication process that is performed by the external device 2 to determine the legitimacy of the user of the IC card 1 based on the received PIN is the same as the process performed in existing systems. Therefore, to achieve the personal authentication process, the IC card 1 according to the present embodiment can be applied to existing systems that use a PIN, without making any change to the systems.

Also, in the present embodiment, the PIN generating unit 52 generates a PIN that is authentication information from the fingerprint information, based on a predetermined algorithm.

Consequently, the IC card 1 according to the present embodiment generates a PIN as authentication information each time, and it is therefore unnecessary to store the PIN in the EEPROM 8, for example. The IC card 1 according to the present embodiment does not need to store the PIN, and it is therefore possible to further reduce the possibility of the PIN that serves as authentication information leaking due to physical analysis or the like of the IC card 1, for example. Therefore, the IC card 1 according to the present embodiment can reduce the capacity of the EEPROM 8, and further improve the security of the IC card 1.

Note that the IC card system 200 according to the present embodiment is an example of a system, and includes the IC card 1 and the external device 2. The IC card 1 includes the fingerprint information obtaining unit 51, the PIN generating unit 52, and the authentication information output unit 53. The external device 2 determines the legitimacy of the user of the IC card 1 based on the PIN that is the authentication information that has been output by the authentication information output unit 53 of the IC card 1.

Consequently, as with the IC card 1, the IC card system 200 according to the present embodiment can reduce the possibility of the PIN leaking to a third party, and thus further improve the security of the IC card system 200.

Second Embodiment

Next, a description is given of an IC card 1a and an IC card system 200a according to a second embodiment with reference to drawings.

In the present embodiment, a description is given of an example in which the IC card 1a outputs encrypted authentication information.

Figure 6:
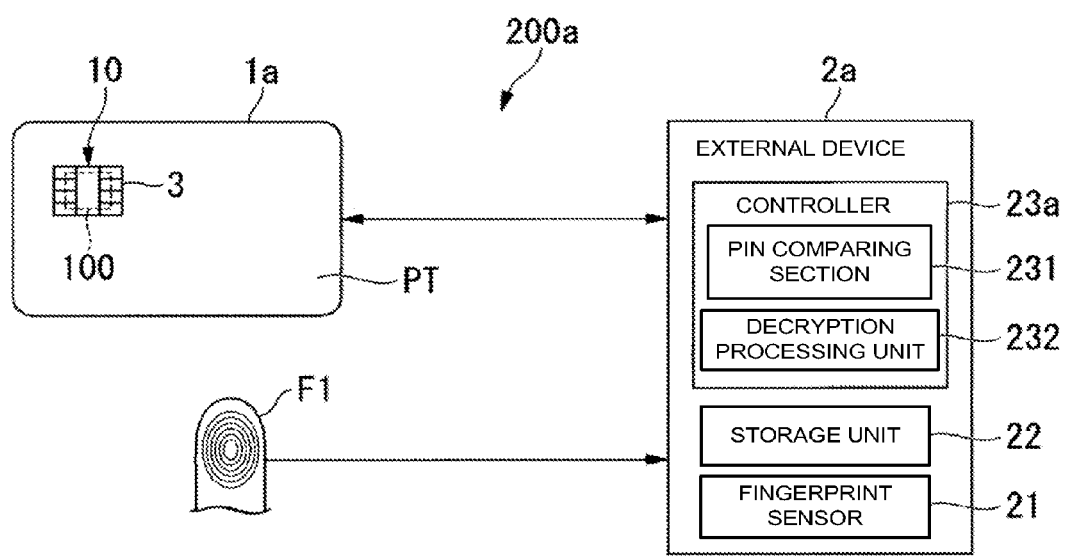
FIG. 6 is a block diagram showing an IC card system according to a second embodiment.

FIG. 6 is a block diagram showing an IC card system according to the present embodiment.

As shown in FIG. 6, the IC card system 200a includes the IC card 1a and an external device 2a.

Note that in this drawing, the same constituent elements as those shown in FIG. 1 are given the same reference signs, and the description thereof is omitted.

The hardware configuration of the IC card 1a is the same as that of the first embodiment shown in FIG. 3, and therefore the description thereof is omitted here. The functional configuration of the IC card 1a is described below.

The external device 2a includes the fingerprint sensor 21, the storage unit 22, and a control unit 23a, for example. The control unit 23a includes the PIN comparing unit 231 and a decryption processing unit 232. Note that the external device 2a according to the present embodiment is different from the external device 2 according to the first embodiment in that the external device 2a includes the decryption processing unit 232.

The decryption processing unit 232 decrypts a cipher text (encrypted information) that is output from the IC card 1a, thereby creating a plain text (decrypted information). The decryption processing unit 232 decrypts the encrypted authentication information, and outputs the decrypted authentication information to the PIN comparing unit 231, for example.

Note that the PIN comparing unit 231 according to the present embodiment obtains the card ID, the account number (PAN), the PIN, and the like as the authentication information that has been decrypted by the decryption processing unit 232, and compares the obtained PIN with the PIN that corresponds to the obtained card ID and the obtained account number (PAN).

Figure 7:
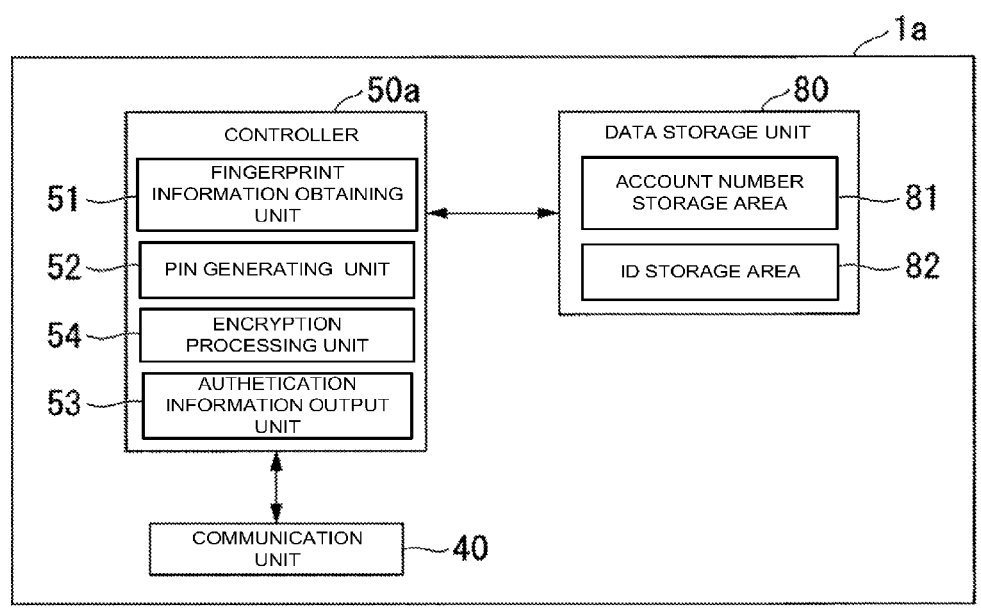
FIG. 7 is a block diagram showing an example of a functional configuration of an IC card according to the second embodiment.

Next, a description is given of the functional configuration of the IC card 1a according to the present embodiment with reference to FIG. 7.

FIG. 7 is a block diagram showing an example of the functional configuration of the IC card 1a according to the present embodiment.

As shown in FIG. 7, the IC card 1a includes the communication unit 40, a control unit 50a, and the data storage unit 80. Note that in this drawing, the same functional elements as those shown in FIG. 4 are given the same reference signs, and the description thereof is omitted.

Here, each unit shown in FIG. 7 is realized by using the hardware shown in FIG. 3.

The control unit 50a is realized by the CPU 5, the RAM 7, and the ROM 6 or the EEPROM 8, and has comprehensive control over the IC card 1a, for example. The control unit 50a includes the fingerprint information obtaining unit 51, the PIN generating unit 52, the authentication information output unit 53, and an encryption processing unit 54, for example. The IC card 1a according to the present embodiment is different from the IC card 1 according to the first embodiment in that the control unit 50a includes the encryption processing unit 54.

The encryption processing unit 54 encrypts authentication information. That is, the encryption processing unit 54 encrypts the PIN that has been generated by the PIN generating unit 52, and the card ID and the account number (PAN) that are stored in the data storage unit 80, thereby generating a cipher text.

The authentication information output unit 53 outputs the authentication information that has been encrypted by the encryption processing unit 54 to the external device 2a.

Figure 8:
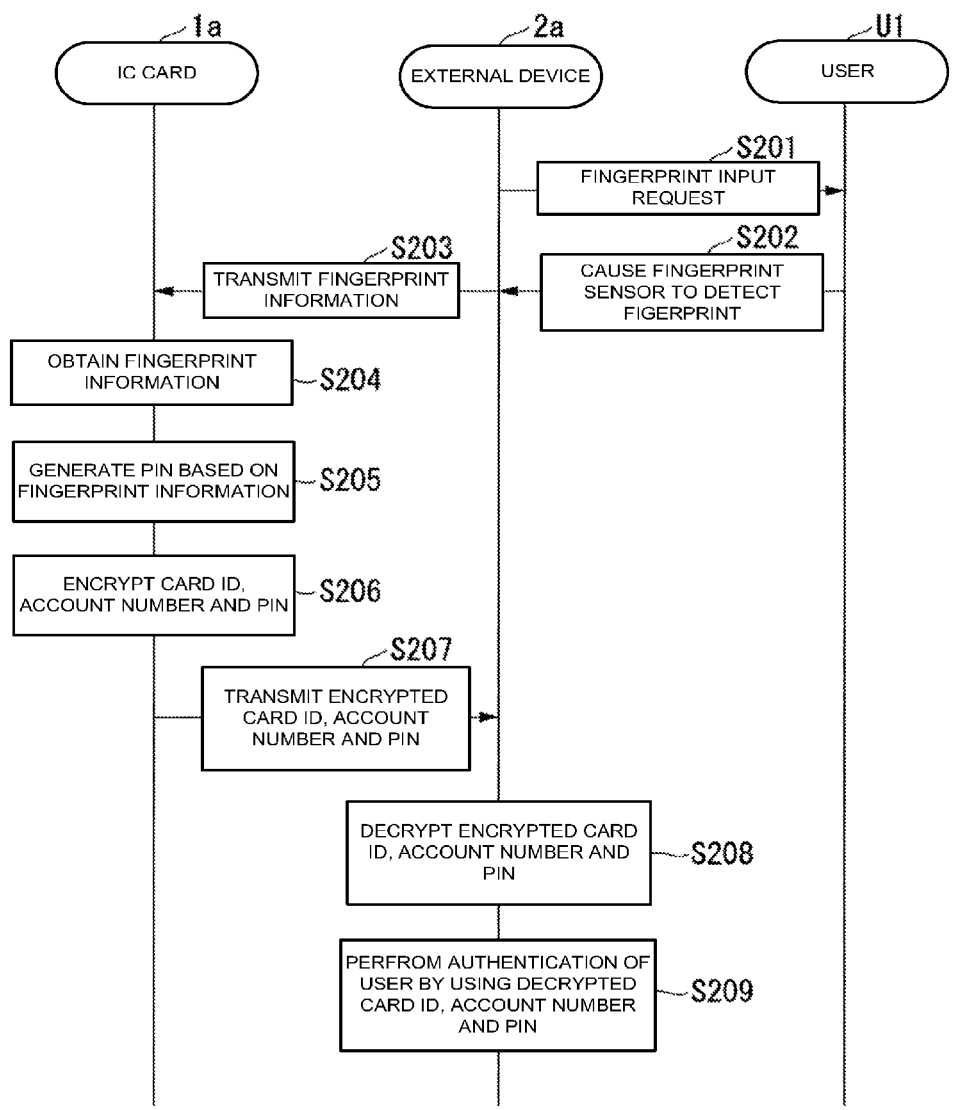
FIG. 8 is a diagram showing an example of an authentication process performed by the IC card system according to the second embodiment.

Next, a description is given of an authentication process performed by the IC card system 200a according to the present embodiment with reference to FIG. 8.

FIG. 8 is a diagram showing an example of the authentication process performed by the IC card system 200a. Note that in the description of this drawing, it is assumed that the user of the IC card system 200a is the user U1.

The processes from step S201 to step S205 in FIG. 8 are the same as step S101 to step S105 shown in FIG. 5 described above, and therefore the description thereof is omitted here.

In step S206, the IC card 1a encrypts the authentication information, namely the card ID, the account number (PAN), and the PIN. That is, the encryption processing unit 54 of the IC card 1a encrypts the PIN that has been generated by the PIN generating unit 52, and the card ID and the account number (PAN) that are stored in the data storage unit 80.

Next, the IC card 1a transmits the encrypted card ID, the encrypted account number (PAN), and the encrypted PIN to the external device 2a (step S207). That is, the authentication information output unit 53 of the IC card 1a outputs the card ID, the account number (PAN), and the PIN that have been encrypted by the encryption processing unit 54 to the external device 2a via the communication unit 40 as a response to a command.

Next, the external device 2a decrypts the encrypted card ID, the encrypted account number (PAN), and the encrypted PIN (step S208). That is, the decryption processing unit 232 of the external device 2a decrypts the encrypted card ID, the encrypted account number (PAN), and the encrypted PIN, and outputs the decrypted card ID, the decrypted account number (PAN), and the decrypted PIN to the PIN comparing unit 231.

Next, the external device 2a performs authentication of the user 171 by using the decrypted card ID, the decrypted account number (PAN), and the decrypted PIN (step S209). That is, the PIN comparing unit 231 of the external device 2a performs the same process as in step S107 shown in FIG. 5 described above.

As described above, the IC card 1a according to the present embodiment includes the encryption processing unit 54 that encrypts the authentication information (e.g., the card ID, the account number (PAN), and the generated PIN). Then, the authentication information output unit 53 outputs the authentication information that has been encrypted by the encryption processing unit 54 to the external device 2a.

Consequently, the encrypted authentication information (e.g., the PIN, the account number (PAN), and the card ID) is output to the outside of the IC card 1a, and plain text authentication information (e.g., the PIN, the account number (PAN), and the card ID) is not output. Therefore, the IC card 1a according to the present embodiment can further reduce the possibility of leakage of the authentication information such as the PIN and the account number (PAN). Therefore, the IC card 1a according to the present embodiment can further improve the security of the IC card 1a.

Third Embodiment

Next, a description is given of an IC card 1b and an IC card system 200b according to a third embodiment with reference to drawings.

In the present embodiment, an example is described in which the IC card 1b performs offline authentication by internally performing a PIN comparison.

Figure 9:
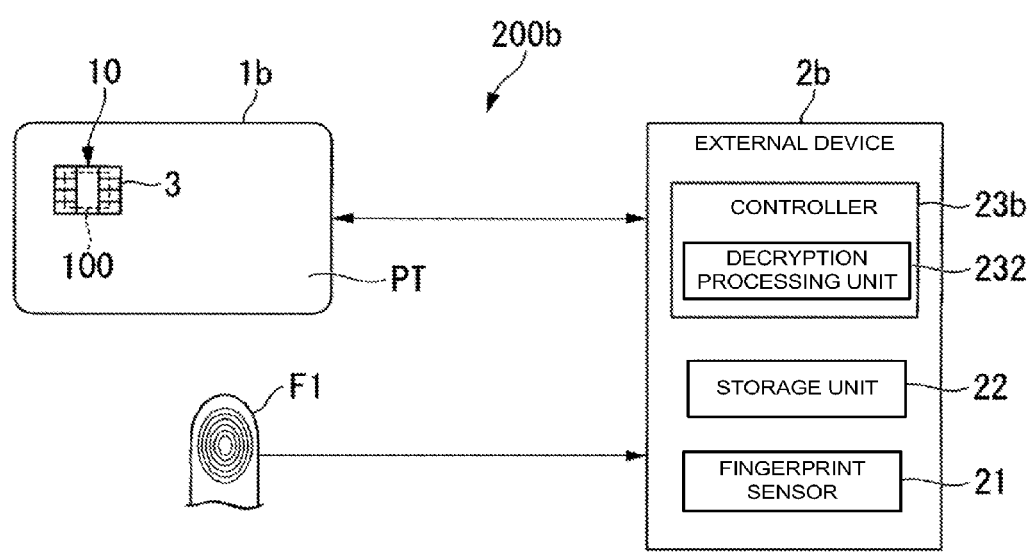
FIG. 9 is a block diagram showing an IC card system according to a third embodiment.

FIG. 9 is a block diagram showing an IC card system according to the present embodiment.

As shown in FIG. 9, the IC card system 200b includes the IC card 1b and an external device 2b.

Note that in this drawing, the same constituent elements as those shown in FIG. 6 are given the same reference signs, and the description thereof is omitted.

The hardware configuration of the IC card 1b is the same as that of the first embodiment shown in FIG. 3, and therefore the description thereof is omitted here. The functional configuration of the IC card 1b is described below.

The external device 2b includes the fingerprint sensor 21, the storage unit 22, and a control unit 23b, for example. The control unit 23b includes the decryption processing unit 232. Note that the external device 2b according to the present embodiment is different from the external device 2a according to the second embodiment in that the external device 2b does not include the PIN comparing unit 231.

In the external device 2b, the control unit 23b receives the result of PIN comparison (hereinafter referred to as the PIN comparison result) from the IC card 1b, and performs certain processes according to the received PIN comparison result.

Figure 10:
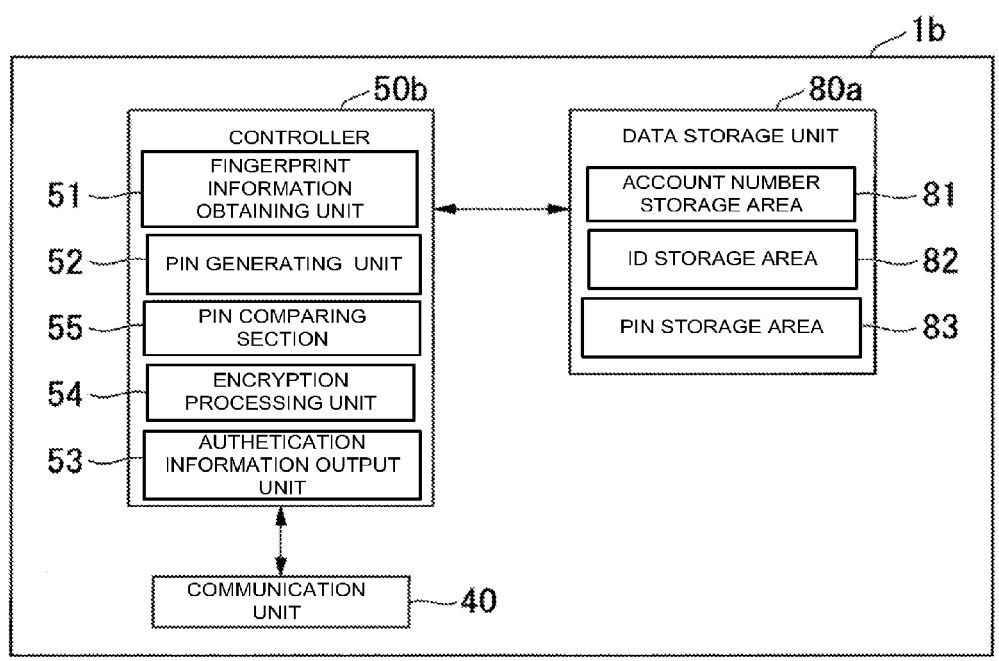
FIG. 10 is a block diagram showing an example of a functional configuration of an IC card according to the third embodiment.

Next, a description is given of the functional configuration of the IC card 1b according to the present embodiment with reference to FIG. 10.

FIG. 10 is a block diagram showing an example of the functional configuration of the IC card 1b according to the present embodiment.

As shown in FIG. 10, the IC card 1b includes the communication unit 40, a control unit 50b, and a data storage unit 80a. Note that in this drawing, the same functional elements as those shown in FIG. 7 are given the same reference signs, and the description thereof is omitted. Each unit shown in FIG. 10 is realized by using the hardware shown in FIG. 3.

The data storage unit 80a is an example of a storage unit, and is constituted by the EEPROM 8, for example. The data storage unit 80a includes the account number storage area 81, the ID storage area 82, and a PIN storage area 83, for example. The data storage unit 80a stores therein the card ID, the account number (PAN), and the PIN in association with each other, for example.

The PIN storage area 83 stores therein the PIN that is to be compared when performing PIN comparison within the IC card 1b. The PIN stored in the PIN storage area 83 is information that has been generated in advance based on the fingerprint information of the owner of the IC card 1b, and is information that has been generated by the same method as the method employed by the above-described PIN generating unit 52.

The control unit 50b is realized by the CPU 5, the RAM 7, and the ROM 6 or the EEPROM 8, and has comprehensive control over the IC card 1b, for example. The control unit 50b includes the fingerprint information obtaining unit 51, the PIN generating unit 52, the authentication information output unit 53, the encryption processing unit 54, and a PIN comparing unit 55, for example.

Note that the IC card 1b according to the present embodiment is different from the IC card 1a according to the second embodiment in that the data storage unit 80a includes the PIN storage area 83 and the control unit 50b includes the PIN comparing unit 55.

The PIN comparing unit 55 is an example of a determination unit, and determines the legitimacy of the user of the IC card 1b based on the PIN generated by the PIN generating unit 52. In the present embodiment, the authentication information is the PIN generated by the PIN generating unit 52. The PIN comparing unit 55 determines the legitimacy of the user of the IC card 1b by comparing the PIN that has been generated by the PIN generating unit 52 with the PIN that is stored in the PIN storage area 83 of the data storage unit 80a, for example. If the PIN generated by the PIN generating unit 52 matches the PIN stored in the PIN storage area 83 for example, the PIN comparing unit 55 determines that the user of the IC card 1b is the legitimate owner of the IC card 1b. If the PIN generated by the PIN generating unit 52 does not match the PIN stored in the PIN storage area 83 for example, the PIN comparing unit 55 determines that the user of the IC card 1b is not the legitimate owner of the IC card 1b.

Note that the control unit 50b performs certain processes according to the PIN comparison result (the authentication result) performed by the PIN comparing unit 55.

The encryption processing unit 54 according to the present embodiment encrypts the card ID and the account number (PAN) that are stored in the data storage unit 80a, thereby generating a cipher text.

The authentication information output unit 53 according to the present embodiment outputs the PIN comparison result (authentication result) and the card ID and the account number (PAN) that have been encrypted by the encryption processing unit 54 to the external device 2b via the communication unit 40 as a response to a command. That is, the authentication information output unit 53 causes the communication unit 40 to output the PIN comparison result (authentication result) and the encrypted card ID and the encrypted account number (PAN).

Figure 11:
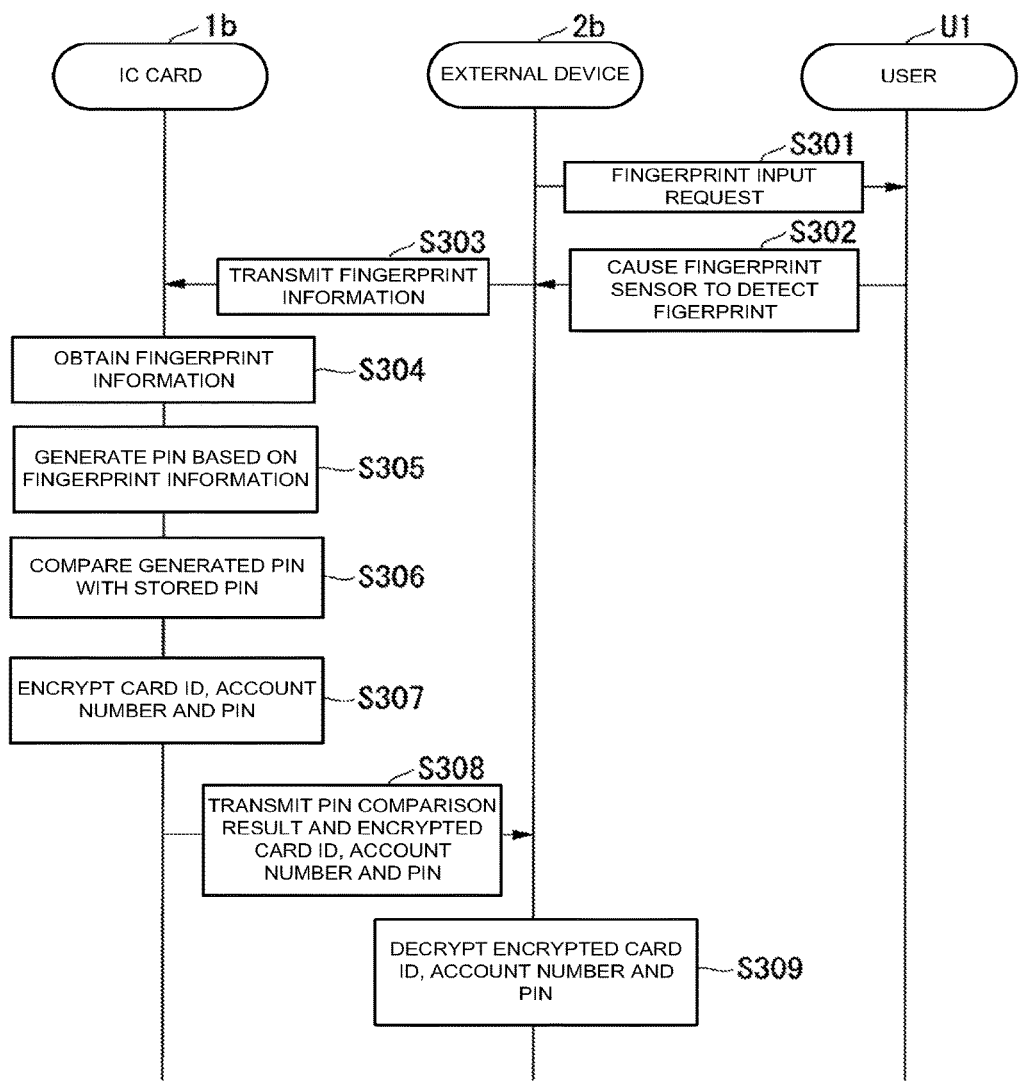
FIG. 11 is a diagram showing an example of an authentication process performed by the IC card system according to the third embodiment.

Next, a description is given of an authentication process performed by the IC card system 200b according to the present embodiment, with reference to FIG. 11.

FIG. 11 is a diagram showing an example of the authentication process performed by the IC card system 200b according to the present embodiment.

Note that in the description of this drawing, it is assumed that the user of the IC card system 200b is the user U1.

The processes from step S301 to step S305 in FIG. 11 are the same as step S201 to step S205 shown in FIG. 8 described above, and therefore the description thereof is omitted here.

In step S306, the IC card 1b compares the generated PIN with the stored PIN. That is, the PIN comparing unit 55 of the IC card 1b determines the legitimacy of the user UI by comparing the PIN that has been generated by the PIN generating unit 52 with the PIN that is stored in the PIN storage area 83 of the data storage unit 80a, for example.

Next, the IC card 1b encrypts the card ID and the account number (PAN) (step S307). That is, the encryption processing unit 54 of the IC card 1b encrypts the card ID and the account number (PAN) that are stored in the data storage unit 80a.

Next, the IC card 1b transmits the PIN comparison result (authentication result) and the encrypted card ID and the encrypted account number (PAN) to the external device 2b (step S308). That is, the authentication information output unit 53 of the IC card 1b outputs the PIN comparison result (authentication result) and the card ID and the account number (PAN) that have been encrypted by the encryption processing unit 54 to the external device 2b via the communication unit 40 as a response to a command.

Next, the external device 2b decrypts the encrypted card ID and the encrypted account number (PAN) (step S309). That is, the decryption processing unit 232 of the external device 2b decrypts the encrypted card ID and the encrypted account number (PAN).

Note that the control unit 23b of the external device 2b receives the PIN comparison result (authentication result) from the IC card 1b, and performs certain processes according to the received PIN comparison result (authentication result).

As described above, the IC card 1b according to the present embodiment includes the PIN comparing unit 55 that determines the legitimacy of the user (e.g., the user U1) of the system based on the authentication information (i.e., the PIN) that has been generated by the PIN generating unit 52. The PIN comparing unit 55 is an example of a determination unit.

Consequently, the IC card 1b according to the present embodiment can internally determine the legitimacy of the user of the IC card 1b, and therefore does not need to output the generated PIN to the external device 2b. Therefore, the IC card 1b according to the present embodiment can further improve the security of the IC card 1b.

Also, in the present embodiment, the IC card 1b outputs the result of determination (PIN comparison result) as to the legitimacy of the user of the IC card 1b to the external device 2b. Therefore, the external device 2b does not need to include the above-described PIN comparing unit 231, and the configuration thereof can be simplified.

Note that in the present embodiment above, although a description has been given of the case where the external device 2b does not include the PIN comparing unit 231, the external device 2b may include the PIN comparing unit 231, and PIN comparison may be performed both inside the IC card 1b and outside the IC card 1b (in the external device 2b).

Fourth Embodiment

Next, a description is given of an IC card 1c and an IC card system 200c according to a fourth embodiment with reference to drawings.

In the present embodiment, a description is given of an example in which the IC card 1c includes a fingerprint sensor 11 that detects fingerprint information.

Figure 12:
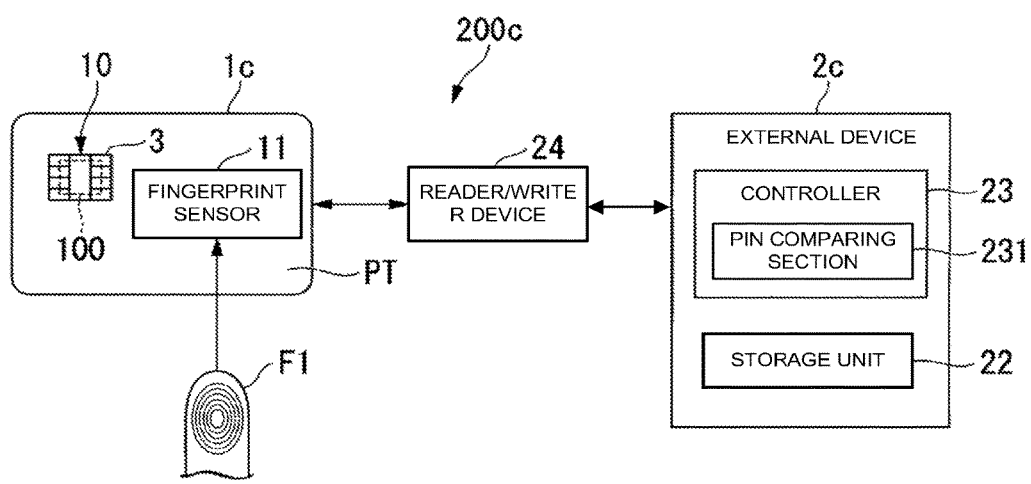
FIG. 12 is a block diagram showing an IC card system according to a fourth embodiment.

FIG. 12 is a block diagram showing an IC card system according to the present embodiment.

As shown in FIG. 12, the IC card system 200c includes the IC card 1c, a reader/writer device 24, and an external device 2c.

Note that in this drawing, the same constituent elements as those shown in FIG. 1 are given the same reference signs, and the description thereof is omitted.

The hardware configuration of the IC card 1c is basically the same as that of the first embodiment shown in FIG. 1. However, the hardware configuration of the IC card 1c is different from that of the above-described first embodiment in that the IC card 1c includes the fingerprint sensor 11. The IC card 1c includes the fingerprint sensor 11, which is disposed on a second surface that is opposite to a first surface that has the contact unit 3, for example (see FIG. 13). The functional configuration of the IC card 1c is described below.

The fingerprint sensor 11 is an example of a biometric information detecting unit, and detects the fingerprint information of the finger F1 of the user of the IC card 1c. The fingerprint sensor 11 operates by using power that is supplied from the reader/writer device 24 via the contact unit 3, for example. As with the above-described fingerprint sensor 21, the fingerprint sensor 11 has a camera that includes a CCD (Charge Coupled Device) image sensor or a CMOS image sensor, and detects fingerprint information based on an image that indicates the shape of the fingerprint that has been captured by the camera, for example. The camera is an image capturing unit.

The external device 2c includes the storage unit 22 and the control unit 23, for example. Note that the external device 2c according to the present embodiment is different from the external device 2 according to the first embodiment in that the external device 2c does not include the fingerprint sensor 21 and the external device 2c communicates with the IC card 1c via the reader/writer device 24.

The reader/writer device 24 is disposed between the IC card 1c and the external device 2c. The reader/writer device 24 causes the IC card 1c to perform a process that corresponds to a command, based on an instruction from the external device 2c, and outputs the contents of a response that has been received from the IC card 1c to the external device 2c, for example. The reader/writer device 24 may be a device that relays communication between the IC card 1c and the external device 2c.

Figure 13:
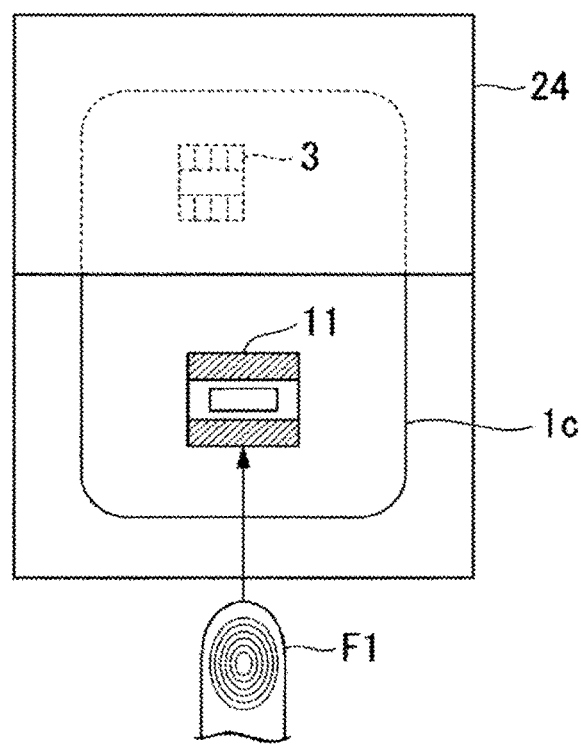
FIG. 13 is an external view of an example of a reader/writer device and an IC card according to the fourth embodiment.

Also, the reader/writer device 24 holds the IC card 1c as shown in FIG. 13, for example.

FIG. 13 is an external view of an example of the reader/writer device 24 and the IC card 1c according to the present embodiment.

As shown in FIG. 13, the reader/writer device 24 is configured to hold the IC card 1c so as to cover the contact unit 3 of the IC card 1c and expose the fingerprint sensor 11, for example. The reader/writer device 24 supplies power to the contact unit 3, thereby making the fingerprint sensor 11 available, and the fingerprint sensor 11 detects the fingerprint from the finger F1 of the user of the IC card 1c in a situation where the IC card 1c is held by the reader/writer device 24.

Figure 14:
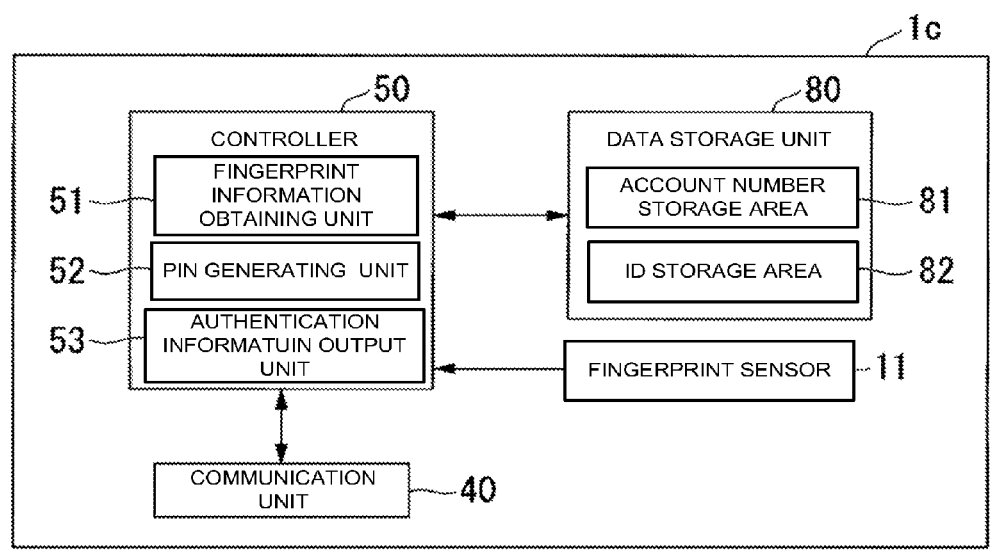
FIG. 14 is a block diagram showing an example of a functional configuration of the IC card according to the fourth embodiment.

Next, a description is given of the functional configuration of the IC card 1c according to the present embodiment with reference to FIG. 14.

FIG. 14 is a block diagram showing an example of the functional configuration of the IC card 1c according to the present embodiment.

As shown in FIG. 14, the IC card 1c includes the communication unit 40, the control unit 50, the data storage unit 80, and the fingerprint sensor 11. Note that in this drawing, the same functional elements as those shown in FIG. 4 are given the same reference signs, and the description thereof is omitted.

Here, each unit shown in FIG. 14 is realized by using the hardware shown in FIG. 3 and the fingerprint sensor 11.

As described above, the fingerprint sensor 11 detects the fingerprint information of the user of the IC card 1c, and outputs the detected fingerprint information to the fingerprint information obtaining unit 51 of the control unit 50.

Note that the fingerprint information obtaining unit 51 of the control unit 50 according to the present embodiment obtains the fingerprint information of the user of the IC card 1c detected by the fingerprint sensor 11.

Figure 15:
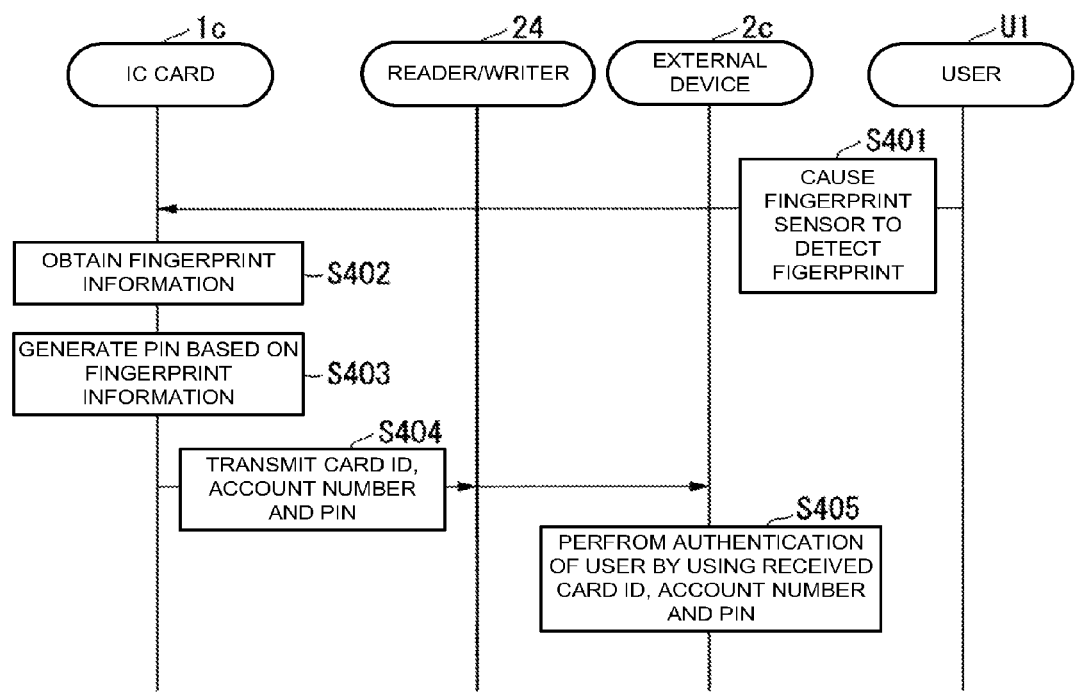
FIG. 15 is a diagram showing an example of an authentication process performed by the IC card system according to the fourth embodiment.

Next, a description is given of an authentication process performed by the IC card system 200c according to the present embodiment, with reference to FIG. 15.

FIG. 15 is a diagram showing an example of the authentication process performed by the IC card system 200c according to the present embodiment.

Note that in the description of this drawing, it is assumed that the user of the IC card system 200c is the user U1.

In FIG. 15, first, the IC card 1c is set to the reader/writer device 24, and the user U1 causes the fingerprint sensor 11 of the IC card 1c to detect the fingerprint (step S401). That is, the user U1 runs the finger F1 over the fingerprint sensor 11 of the IC card 1c, and consequently the fingerprint sensor 11 detects the fingerprint information.

Next, the IC card 1c obtains the fingerprint information (step S402). That is, the fingerprint information obtaining unit 51 of the IC card 1c obtains the fingerprint information detected by the fingerprint sensor 11.

The subsequent processes in step S403 to step S405 are the same as step S105 to step S107 shown in FIG. 5 described above, and therefore the description thereof is omitted here. Note that in the present embodiment, in step S404, the IC card 1c may transmit the card ID, the account number, and the generated PIN, as a response to the command for generation of the PIN from the external device 2c.

As described above, the IC card 1c according to the present embodiment includes the fingerprint sensor 11 that is an example of a biometric information detecting unit and that detects fingerprint information. The fingerprint information obtaining unit 51 obtains the fingerprint information detected by the fingerprint sensor 11.

Consequently, the IC card 1c according to the present embodiment does not need to receive fingerprint information from the external device 2c, and it is therefore possible to reduce the possibility of the relationship between the fingerprint information and the PIN being analyzed. Therefore, the IC card 1c according to the present embodiment can further improve the security of the IC card 1c.

Also, in the present embodiment, the reader/writer device 24 is configured to communicate with the IC card 1c with the fingerprint sensor 11 being exposed, as shown in FIG. 13.

Consequently, the IC card 1c can appropriately detect the fingerprint information by using the fingerprint sensor 11.

Fifth Embodiment

Next, a description is given of an IC card 1d and an IC card system 200d according to a fifth embodiment with reference to drawings.

In the present embodiment, a description is given of an example in which the IC card 1d generates a PIN based on the fingerprint information by a method that is different from the method adopted in the above-described first to fourth embodiment. Note that the IC card system 200d according to the present embodiment is different from the first embodiment shown in FIG. 1 in that the IC card system 200d includes the IC card 1d instead of the IC card 1.

Figure 16:
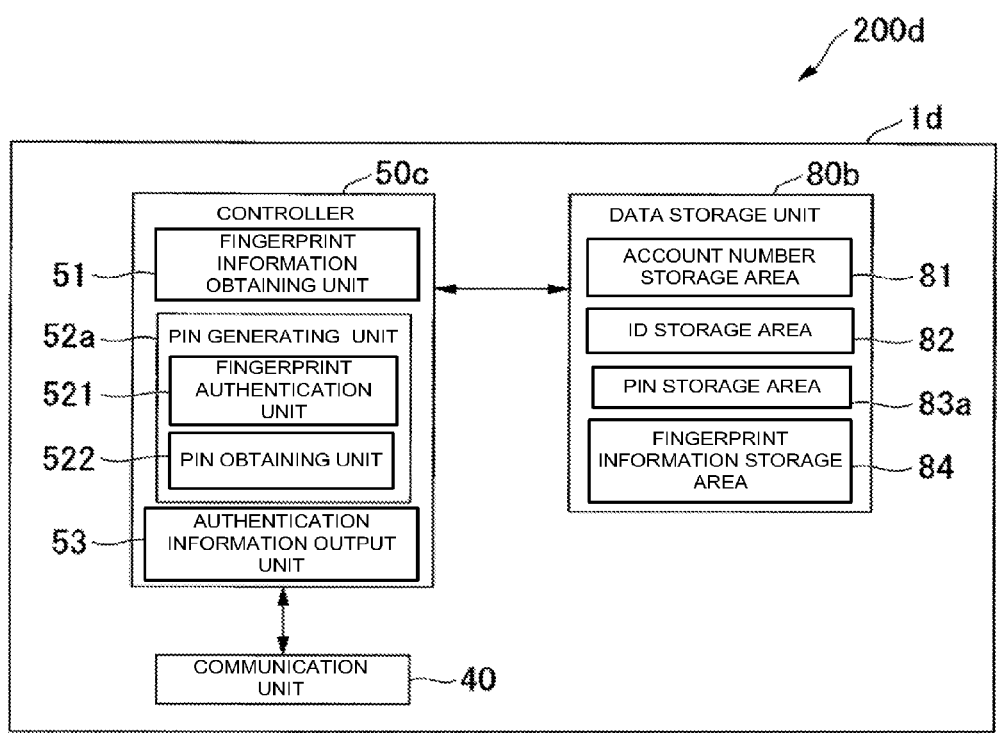
FIG. 16 is a block diagram showing an example of a functional configuration of an IC card according to a fifth embodiment.

FIG. 16 is a block diagram showing an example of the functional configuration of the IC card 1d according to the present embodiment.

As shown in FIG. 16, the IC card 1d includes the communication unit 40, a control unit 50c, and a data storage unit 80b. Note that in this drawing, the same functional elements as those shown in FIG. 4 are given the same reference signs, and the description thereof is omitted.

Also, the hardware configuration of the IC card 1d is the same as that of the first embodiment shown in FIG. 3, and therefore the description thereof is omitted here.

Here, each unit shown in FIG. 16 is realized by using the hardware shown in FIG. 3.

The data storage unit 80b is an example of a storage unit, and is constituted by the EEPROM 8, for example. The data storage unit 80b includes the account number storage area 81, the ID storage area 82, a PIN storage area 83a, and a fingerprint information storage area 84, for example.

The PIN storage area 83a pre-stores therein a PIN that is to be transmitted to the external device 2.

The fingerprint information storage area 84 stores therein reference fingerprint information that is fingerprint information that has been obtained from the owner of the IC card 1d in advance. The reference fingerprint information is an example of reference biometric information. The reference fingerprint information may be image information representing the shape of the fingerprint, or feature values for fingerprint authentication extracted from the image information.

The control unit 50c is realized by the CPU 5, the RAM 7, and the ROM 6 or the EEPROM 8, and has comprehensive control over the IC card 1d, for example. The control unit 50c generates a PIN by reading out the PIN that is numerical information having a predetermined number of digits and that is stored in the above-described PIN storage area 83a, based on the fingerprint information, for example.

The control unit 50c includes the fingerprint information obtaining unit 51, a PIN generating unit 52a, and the authentication information output unit 53, for example.

The PIN generating unit 52a is an example of an authentication information generating unit, and determines whether or not the user of the IC card 1d and the legitimate owner of the IC card 1d are the same person, based on the fingerprint information that has been obtained by the fingerprint information obtaining unit 51 and the reference fingerprint information that is stored in the data storage unit 80b. Upon determining that the user of the IC card 1d and the legitimate owner of the IC card 1d are the same person, the PIN generating unit 52a reads out the PIN from the data storage unit 80b. The PIN generating unit 52a includes a fingerprint authentication unit 521 and a PIN obtaining unit 522.

In this way, the PIN generating unit 52a reads out the PIN from the data storage unit 80b based on the obtained fingerprint information, thereby generating a PIN that is numerical information having a predetermined number of digits.

The fingerprint authentication unit 521 determines whether or not the user of the IC card 1d and the legitimate owner of the IC card 1d are the same person, based on the fingerprint information that has been obtained by the fingerprint information obtaining unit 51 and the reference fingerprint information that is stored in the fingerprint information storage area 84 of the data storage unit 80b. That is, the fingerprint authentication unit 521 compares the feature values extracted from the fingerprint information that has been obtained by the fingerprint information obtaining unit 51, with the feature values that are based on the reference fingerprint information that is stored in the fingerprint information storage area 84. If they match, the fingerprint authentication unit 521 determines that the user of the IC card 1d and the legitimate owner of the IC card 1d are the same person. If they do not match, the fingerprint authentication unit 521 determines that the user of the IC card 1d and the legitimate owner of the IC card 1d are not the same person.

If the fingerprint authentication unit 521 has determined that the user of the IC card 1d and the legitimate owner of the IC card 1d are the same person, the PIN obtaining unit 522 obtains the PIN from the PIN storage area 83a of the data storage unit 80b. The PIN obtaining unit 522 outputs the obtained PIN to the authentication information output unit 53.

Note that the authentication information output unit 53 according to the present embodiment outputs the PIN that has been obtained by the PIN obtaining unit 522 to the external device 2.

Figure 17:
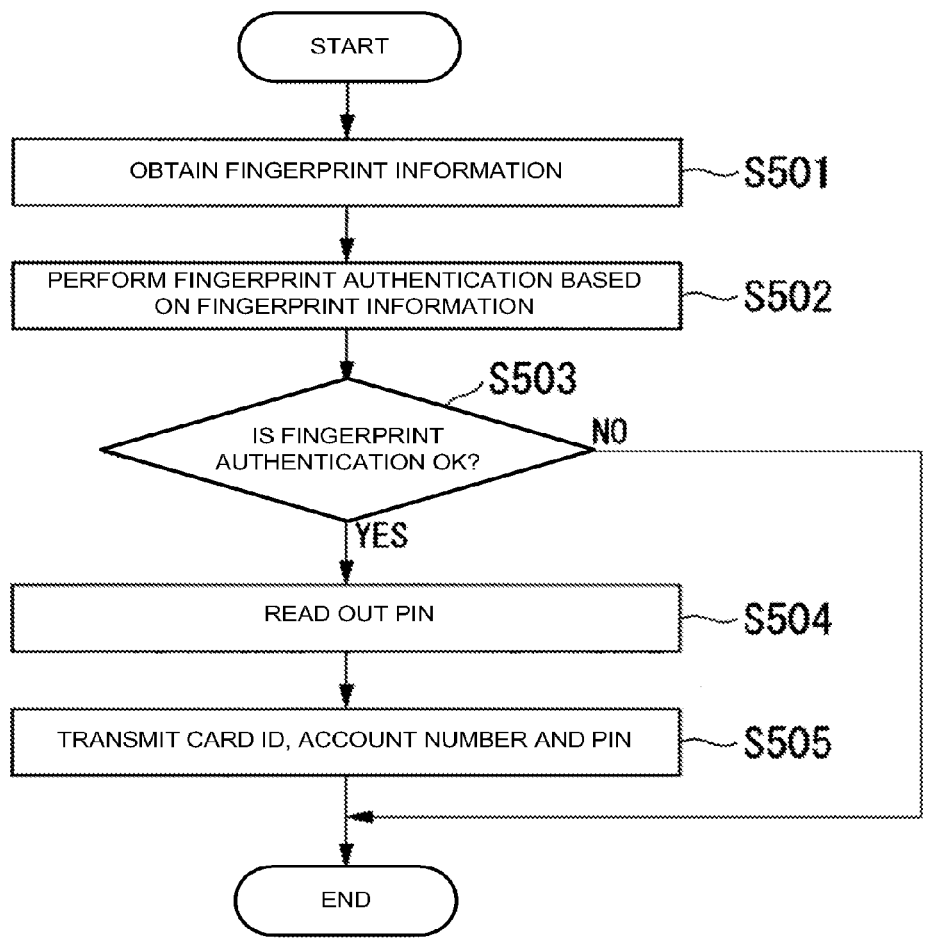
FIG. 17 is a flowchart showing an example of operations of the IC card according to the fifth embodiment.

Next, a description is given of the operations of the IC card 1d according to the present embodiment with reference to FIG. 17.

FIG. 17 is a flowchart showing an example of the operations of the IC card 1d according to the present embodiment. Note that the example shown in this drawing describes operations by which the IC card 1c1 generates the PIN.

In FIG. 17, first, the fingerprint information obtaining unit 51 of the IC card 1d obtains fingerprint information (step S501). The fingerprint information obtaining unit 51 receives, via the communication unit 40, fingerprint information that has been transmitted with a command from the external device 2, thereby obtaining the fingerprint information of the user of the IC card 1d, for example.

Next, the PIN generating unit 52a of the IC card 1d performs fingerprint authentication based on the fingerprint information (step S502). That is, the fingerprint authentication unit 521 of the PIN generating unit 52a determines whether or not the user of the IC card 1d and the legitimate owner of the IC card 1d are the same person based on the feature values that have been extracted from the fingerprint information obtained by the fingerprint information obtaining unit 51 and the feature values that are based on the reference fingerprint information stored in the fingerprint information storage area 84 of the data storage unit 80b.

Next, the fingerprint authentication unit 521 of the PIN generating unit 52a determines whether or not the fingerprint authentication is successful (step S503). Upon determining that the fingerprint authentication is successful (the fingerprint authentication unit 521 has determined that the user of the IC card 1d and the legitimate owner of the IC card 1d are the same person) (step S503: YES) for example, the PIN generating unit 52a proceeds to step S504. Upon determining that the fingerprint authentication is not successful (the fingerprint authentication unit 521 has determined that the user of the IC card 1d and the legitimate owner of the IC card 1d are not the same person) (step S503: NO) for example, the PIN generating unit 52a ends the process.

In step S504, the PIN obtaining unit 522 of the PIN generating unit 52a reads out the PIN from the fingerprint information storage area 84 of the data storage unit 80b.

Next, the authentication information output unit 53 transmits the card ID, the account number (PAN), and the PIN to the external device 2 as authentication information (step S505). That is, the authentication information output unit 53 outputs the PIN that has been obtained by the PIN obtaining unit 522, and the card ID and the account number (PAN) that are stored in the data storage unit 80b, to the external device 2 via the communication unit 40. After performing step S505, the IC card 1d ends the process and enters the state of waiting for a command.

As described above, the IC card 1d according to the present embodiment includes the data storage unit 80b as an example of a storage unit and the PIN generating unit 52a as an authentication information generating unit. The data storage unit 80b stores therein the reference biometric information as biometric information that has been obtained from the owner of the IC card 1d in advance (e.g., the reference fingerprint information), and the authentication information (e.g., the PIN). The PIN generating unit 52a determines whether or not the user of the IC card 1d and the legitimate owner of the IC card 1d are the same person, based on the biometric information (e.g., the fingerprint information) that has been obtained by the fingerprint information obtaining unit 51 and the reference biometric information (e.g., the reference fingerprint information) that is stored in the data storage unit 80b. Upon determining that the user of the IC card 1d and the legitimate owner of the IC card 1d are the same person, the PIN generating unit 52a reads out the authentication information (e.g., the PIN) from the data storage unit 80b, thereby generating the authentication information.

Consequently, the IC card 1d according to the present embodiment can appropriately generate the authentication information (e.g., the PIN) from the biometric information (e.g., the fingerprint information) by simply reading out the authentication information (e.g., the PIN) from the data storage unit 80b. Note that the IC card 1d according to the present embodiment can generate authentication information (e.g., a PIN) that is not correlated with the biometric information (e.g., the fingerprint information) at all, and improve the flexibility in generating the authentication information (e.g., the PIN).

Sixth Embodiment

Next, a description is given of an IC card system 200e according to a sixth embodiment with reference to drawings.

In the present embodiment, a description is given of a registration device 26 that performs registration of a PIN (a reference PIN for comparison) that is to be compared with the PIN generated by the above-described IC card 1 (1a, 1b, 1c, 1d). Here, a description is given of a system configured by adding the registration device 26 to the IC card system 200 according to the first embodiment, for example.

Figure 18:
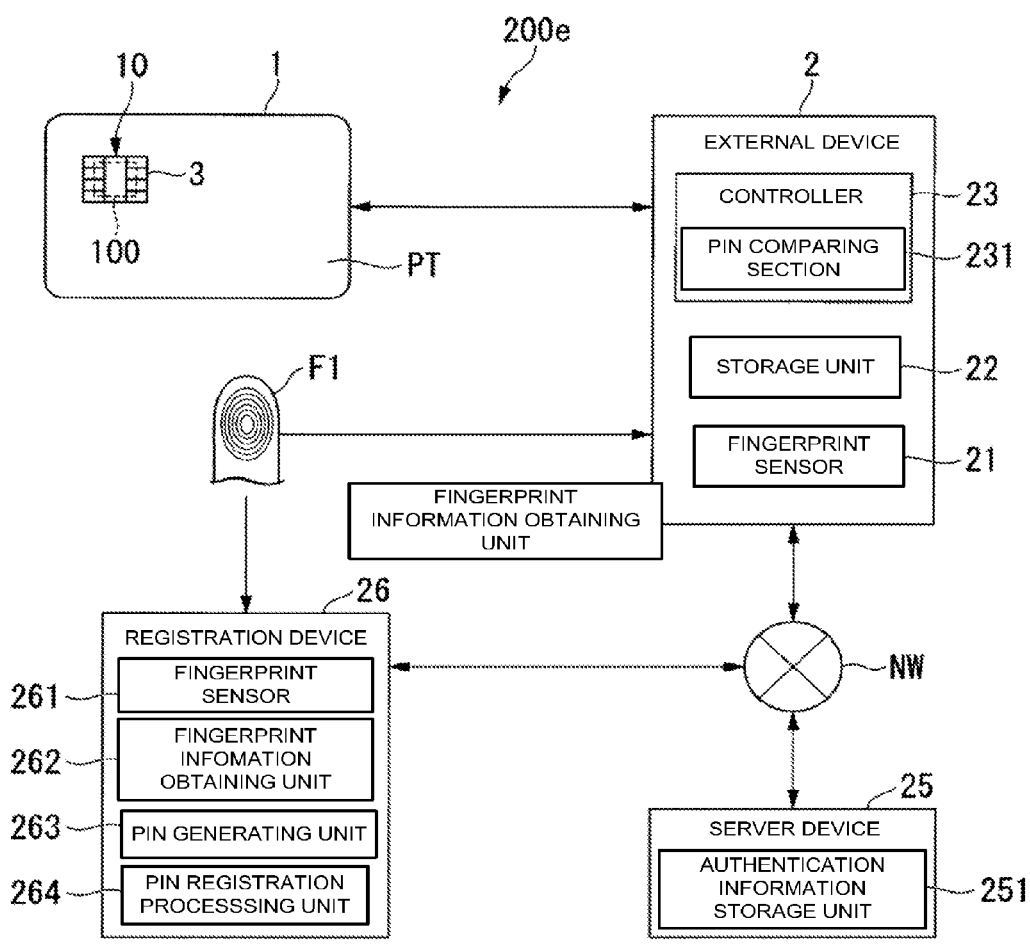
FIG. 18 is a block diagram showing an IC card system according to a sixth embodiment.

FIG. 18 is a block diagram showing an IC card system according to the present embodiment.

As shown in FIG. 18, the IC card system 200e includes the IC card 1, the external device 2, a server device 25, and the registration device 26. The external device 2, the server device 25, and the registration device 26 are connected via a network NW.

Note that in this drawing, the same constituent elements as those shown in FIG. 1 are given the same reference signs, and the description thereof is omitted.

The server device 25 is a server with which the authentication information of users that use the IC card system 200e is registered. The server device 25 includes an authentication information storage unit 251, for example. Note that the external device 2 obtains the authentication information that has been registered with (has been stored to) the server device 25, and has stored the authentication information thus obtained to the storage unit 22 in advance.

The authentication information storage unit 251 stores therein the authentication information of the user that uses the IC card system 200e. Here, the authentication information includes the card ID, the account number (PAN), and the PIN. The authentication information storage unit 251 stores therein "card ID", "account number", and "PIN" that are associated with each other, as with those shown in FIG. 2 described above, for example. Note that the authentication information has been registered with (has been stored to) the authentication information storage unit 251 by the registration device 26.

The registration device 26 is a device that registers authentication information that includes a PIN with the server device 25. The registration device 26 includes a fingerprint sensor 261, a fingerprint information obtaining unit 262, a PIN generating unit 263, and a PIN registration processing unit 264.

The fingerprint sensor 261 is an example of a biometric information detecting unit, and detects the fingerprint information of the finger F1 of the legitimate owner of the IC card 1. The fingerprint sensor 261 has, as with the above-described fingerprint sensor 21, a camera that includes a CCD (Charge Coupled Device) image sensor or a CMOS image sensor, and detects fingerprint information based on an image that indicates the shape of the fingerprint that has been captured, for example. The camera is an image capturing unit.

The fingerprint information obtaining unit 262 is an example of a biometric information obtaining unit, and obtains the fingerprint information of the owner of the IC card 1. That is, the fingerprint information obtaining unit 262 obtains the fingerprint information that has been detected by the fingerprint sensor 261.

The PIN generating unit 263 is an example of an authentication information generating unit, and generates a PIN that is numerical information having a predetermined number of digits, based on the biometric information that has been obtained by the fingerprint information obtaining unit 262. Here, the PIN generating unit 263 generates the PIN by the same method as the method employed by the above-described PIN generating unit 52.

The PIN registration processing unit 264 is an example of an authentication information registration processing unit, and stores the PIN that has been generated by the PIN generating unit 263 to the authentication information storage unit 251 (an example of a storage unit) of the server device 25. The authentication information storage unit 251 is an example of a storage unit. The PIN registration processing unit 264 stores the PIN to the authentication information storage unit 251 included in the server device 25 connected to the PIN registration processing unit 264 via the network NW. For example, the PIN registration processing unit 264 stores "card ID", "account number", and "PIN" that are associated with each other, to the authentication information storage unit 251 of the server device 25 via the network NW.

Figure 19:
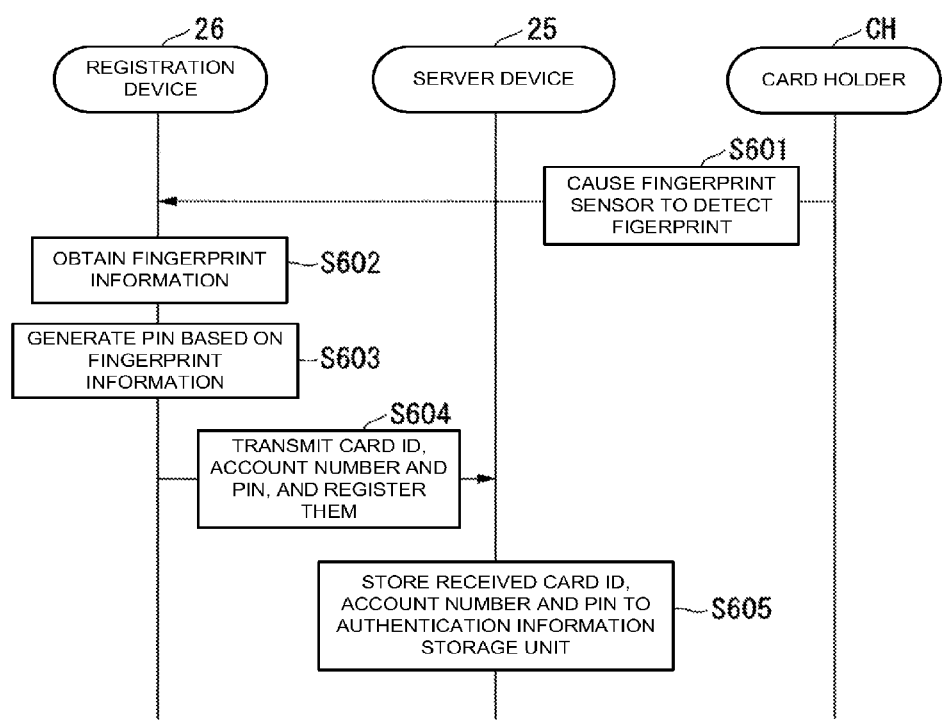
FIG. 19 is a diagram showing an example of a PIN registration process performed by the IC card system according to the sixth embodiment.

Next, a description is given of a PIN registration process that is performed by the IC card system 200*e* according to the present embodiment, with reference to FIG. 19.

FIG. 19 is a diagram showing an example of the PIN registration process that is performed by the IC card system 200*e*.

Note that in this drawing, it is assumed that the owner of the IC card 1 whose PIN is to be registered is a card holder CH.

In FIG. 19, first, the card holder CH causes the fingerprint sensor 261 of the registration device 26 to detect the fingerprint (step S601). That is, the card holder CH runs the finger F1 over the fingerprint sensor 261 of the registration device 26, and consequently the fingerprint sensor 261 detects the fingerprint information.

Next, the registration device 26 obtains the fingerprint information (step S602). That is, the fingerprint information obtaining unit 262 of the registration device 26 obtains the fingerprint information that has been detected by the fingerprint sensor 261.

Next, the registration device 26 generates a PIN based on the fingerprint information (step S603). That is, the PIN generating unit 263 of the registration device 26 generates a PIN that is four-digit numerical information for example, based on the fingerprint information that has been obtained by the fingerprint information obtaining unit 262. Note that the PIN generating unit 263 generates the PIN by the same method as the method employed by the above-described PIN generating unit 52.

Next, the registration device 26 transmits the card ID, the account number (PAN), and the PIN to the server device 25 as the authentication information, and registers them (step S604). That is, the PIN registration processing unit 264 of the registration device 26 outputs the PIN that has been generated by the PIN generating unit 263, and the card ID and the account number (PAN) that have been input to the registration device 26 to the server device 25 via the network NW, for example.

Next, the server device 25 stores the received card ID, the received account number, and the received PIN to the authentication information storage unit 251 in association with each other (step S605). Consequently, the reference PIN for comparison is registered with the server device 25.

As described above, the registration device 26 according to the present embodiment includes the fingerprint information obtaining unit 262, the PIN generating unit 263, and the PIN registration processing unit 264. The fingerprint information obtaining unit 262 obtains the biometric information (e.g., the fingerprint information) that represents the physical feature of the owner of the IC card 1. The PIN generating unit 263 generates authentication information (e.g., a PIN) that is numerical information having a predetermined number of digits and that is used for authentication of the user of the IC card 1, based on the biometric information that has been obtained by the fingerprint information obtaining unit 262. The PIN registration processing unit 264 stores the authentication information (e.g., the PIN) that has been generated by the PIN generating unit 263 to the storage unit (the authentication information storage unit 251).

Consequently, the registration device 26 according to the present embodiment can appropriately register the authentication information (e.g., the PIN) that is to be compared, and the IC card 1 and the IC card system 200*e* according to the present embodiment can improve the security.

Note that the registration device 26 according to the present embodiment does not need to register the biometric information (e.g., the fingerprint information), and it is therefore possible to reduce the possibility of leakage of the biometric information (e.g., the fingerprint information).

Also, according to the present embodiment, the PIN registration processing unit 264 stores the authentication information (e.g., the PIN) to the authentication information storage unit 251 (a storage unit) that is included in the server device 25 that is connected to the PIN registration processing unit 264 via the network NW.

Consequently, the external device 2 can appropriately obtain the legitimate authentication information (e.g., the PIN) that corresponds to the owner of the IC card 1 from the server device 25. Therefore, the IC card system 200*e* can perform authentication of the user of the IC card 1 without requiring the user of the IC card 1 to input the PIN, and this makes it possible to improve the security of the IC card system 200*e*.

Note that a description has been given of an example in which the registration device 26 according to the present embodiment is applied to the IC card system 200 according to the first embodiment, the registration device 26 is not limited to such application, and may be applied to the IC card systems 200*a* to 200*d* according to the second to the fifth embodiments.

Also, in cases where the registration device 26 according to the present embodiment is applied to the IC card system 200*b* according to the second embodiment, the registration device 26 may be configured to store the generated PIN to the PIN storage area 83 of the data storage unit 80*a* included in the IC card 1*b* via a reader/writer device or the like. That is, the PIN registration processing unit 264 stores the authentication information to the data storage unit 80*a* (an example of a storage unit) that is included in the IC card 1*b*.

Consequently, the reference PIN for comparison is appropriately registered with the IC card 1*b*, and therefore the IC card 1*b* can appropriately perform PIN comparison.

Seventh Embodiment

Next, a description is given of an IC card 1*e* and an IC card system 200*f* according to a seventh embodiment with reference to drawings.

In the present embodiment, a description is given of an example in which PIN comparison is performed within the IC card 1*b* as in the case of the IC card 1*b* according to the above-described third embodiment, and the PIN to be compared with (the reference PIN for comparison) is internally generated and registered in advance.

Figure 20:
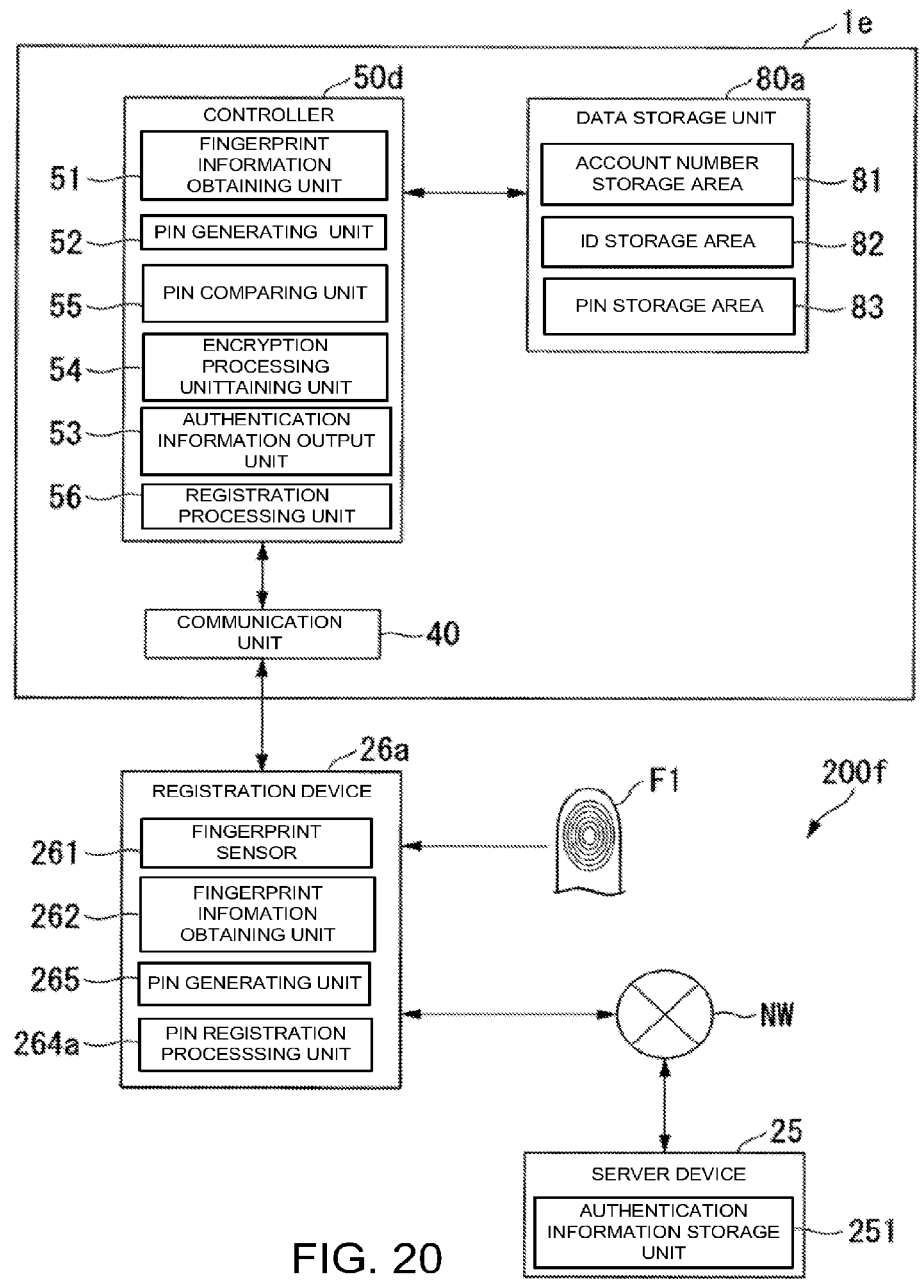
FIG. 20 is a block diagram showing an IC card system according to a seventh embodiment.

FIG. 20 is a block diagram showing an IC card system according to the present embodiment.

As shown in FIG. 20, the IC card system 200f includes the IC card 1e, the server device 25, and a registration device 26a. The server device 25 and the registration device 26a are connected via the network NW.

Note that in this drawing, the same constituent elements as those shown in FIG. 10 and FIG. 18 are given the same reference signs, and the description thereof is omitted. Also, although not shown in the drawing, it is assumed that the server device 25 is connected to any of the above-described external devices 2 and 2a to 2c via the network NW.

The registration device 26a outputs the fingerprint information as a command to the IC card 1e, causes the IC card 1e to execute generation and registration of a PIN, and receives a response that includes the PIN from the IC card 1e. The registration device 26a stores the received PIN to the authentication information storage unit 251 of the server device 25. The registration device 26a includes the fingerprint sensor 261, the fingerprint information obtaining unit 262, a PIN generation instructing unit 265, and a PIN registration processing unit 264a.

The PIN generation instructing unit 265 generates a command that includes the fingerprint information that has been obtained by the fingerprint information obtaining unit 262, outputs the generated command to the IC card 1e, and causes the IC card 1e to execute generation and registration of a PIN. Note that the registration device 26a receives, as a response to this command, a response that includes the card ID, the account number, and the generated PIN.

The PIN registration processing unit 264a transmits the received card ID, the received account number, and the received PIN to the server device 25 via the network NW, and stores them to the authentication information storage unit 251 of the server device 25.

The hardware configuration of the IC card 1e is the same as that of the first embodiment shown in FIG. 3, and therefore the description thereof is omitted here. The IC card 1e includes the communication unit 40, a control unit 50d, and the data storage unit 80a. Here, each unit in the IC card 1e is realized by using the hardware shown in FIG. 3.

The control unit 50d is realized by the CPU 5, the RAM 7, and the ROM 6 or the EEPROM 8, and has comprehensive control over the IC card 1e, for example. The control unit 50d includes the fingerprint information obtaining unit 51, the PIN generating unit 52, the authentication information output unit 53, the encryption processing unit 54, the PIN comparing unit 55, and a registration processing unit 56, for example. Note that the IC card 1e according to the present embodiment is different from the IC card 1b according to the above-described third embodiment in that the control unit 50d includes the registration processing unit 56.

The registration processing unit 56 stores the PIN that has been generated by the PIN generating unit 52 to the PIN storage area 83 of the data storage unit 80a. Here, the PIN to be registered is the PIN that has been generated by the PIN generating unit 52 based on the fingerprint information that has been obtained by the fingerprint information obtaining unit 51 from the registration device 26a.

Figure 21:
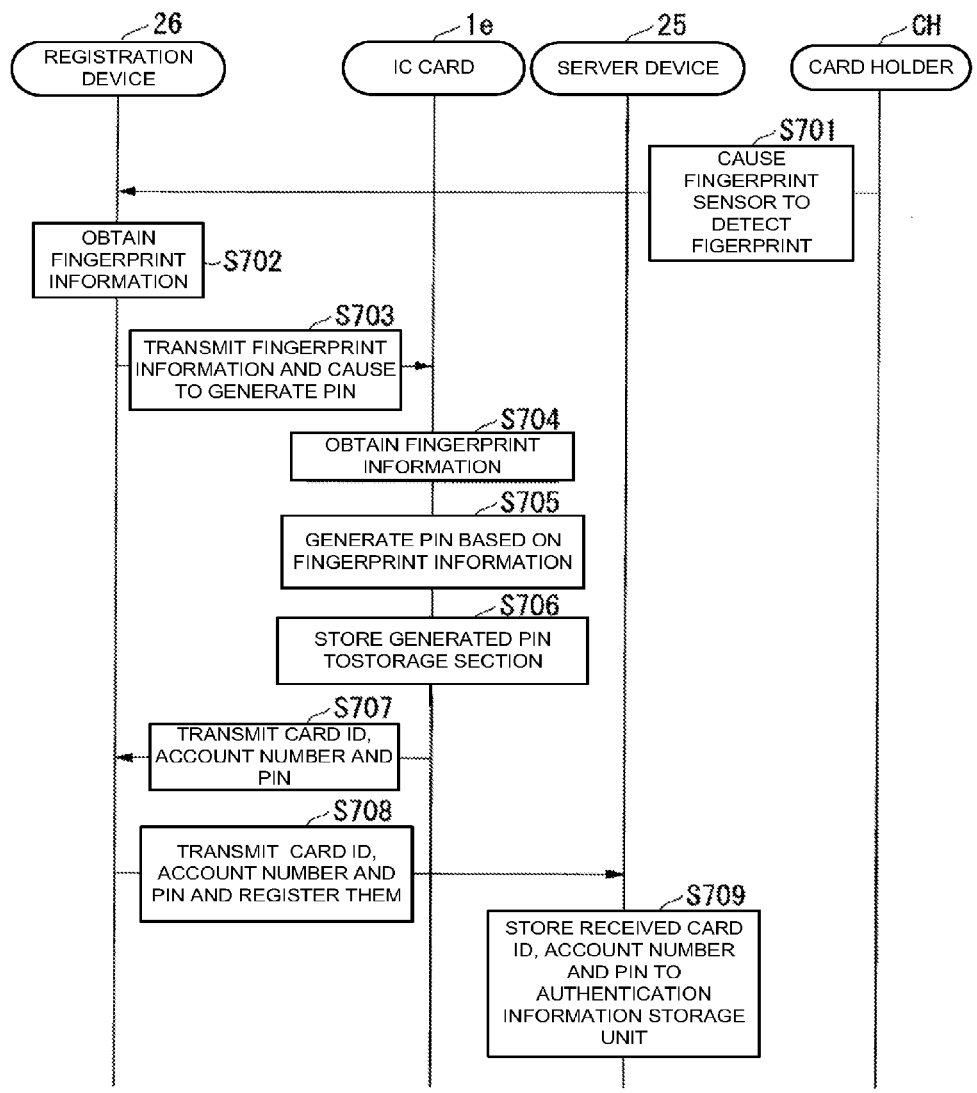
FIG. 21 is a diagram showing an example of a PIN registration process performed by the IC card system according to the seventh embodiment.

Next, a description is given of a PIN registration process that is performed by the IC card system 200f according to the present embodiment, with reference to FIG. 21.

FIG. 21 is a diagram showing an example of the PIN registration process that is performed by the IC card system 200f.

Note that in this drawing, it is assumed that the owner of the IC card 1e whose PIN is to be registered is the card holder CH. It is also assumed that the IC card 1e is connected to the registration device 26a via a reader/writer device, for example.

In FIG. 21, first, the card holder CH causes the fingerprint sensor 261 of the registration device 26a to detect the fingerprint (step S701).

Next, the registration device 26a obtains the fingerprint information (step S702). That is, the fingerprint information obtaining unit 262 of the registration device 26a obtains the fingerprint information that has been detected by the fingerprint sensor 261.

Next, the registration device 26a transmits the fingerprint information to the IC card 1e, and causes the IC card 1e to generate a PIN (step S703). That is, the PIN generation instructing unit 265 of the registration device 26a transmits a command that includes the fingerprint information obtained by the fingerprint information obtaining unit 262, to the IC card 1e.

The subsequent processes in step S704 and step S705 are the same as step S304 and step S305 shown in FIG. 11, and therefore the description thereof is omitted here.

In step S706, the IC card 1e stores the generated PIN to the data storage unit 80a. That is, the registration processing unit 56 of the IC card 1e stores the PIN that has been generated by the PIN generating unit 52 to the PIN storage area 83 of the data storage unit 80a.

Next, the IC card 1e transmits the card ID, the account number, and the PIN to the registration device 26a (step S707). That is, the registration processing unit 56 of the IC card 1e reads out the card ID, the account number, and the PIN that are stored in the data storage unit 80a, and transmits a response that includes the read card ID, the read account number, and the read PIN to the registration device 26a.

Next, the registration device 26a transmits the card ID, the account number, and the PIN to the server device 25, and registers them (step S708). That is, the PIN registration processing unit 264a of the registration device 26a transmits the card ID, the account number, and the PIN that have been received from the IC card 1e to the server device 25 via the network NW.

Next, the server device 25 stores the received card ID, the received account number, and the received PIN to the authentication information storage unit 251 (step S709) in association with each other. Consequently, the reference PIN for comparison is registered with the server device 25.

As described above, the IC card 1e according to the present embodiment includes the registration processing unit 56 that stores the authentication information (e.g., the PIN) that has been generated by the PIN generating unit 52 to the data storage unit 80a.

Consequently, the reference PIN for comparison is appropriately registered with the IC card 1e according to the present embodiment, and therefore the IC card 1e can appropriately perform PIN comparison.

Also, according to the present embodiment, the registration device 26a stores the authentication information (e.g., the PIN) obtained from the IC card 1e to the authentication information storage unit 251 (a storage unit) included in the server device 25.

Consequently, when performing online PIN comparison, the IC card system 200f according to the present embodiment can appropriately perform PIN comparison by using the reference PIN for comparison that has been registered with the server device 25. Also, the IC card system 200f according to the present embodiment does not need to register the biometric information (e.g., the fingerprint information), and it is therefore possible to reduce the possibility of leakage of the biometric information (e.g., the fingerprint information).

A description has been given of an example in which each of the embodiments above is implemented independently. However, the embodiments may be combined with each other.

Also, in each of the embodiments above, a description has been given of an example in which fingerprint information is used as an example of the biometric information. However, the biometric information is not limited to this example, and may represent characteristics of a vein, an iris, a voiceprint, a retina, or a face, for example.

Also, in each of the embodiments above, a PIN that is generated based on biometric information is described as an example of authentication information. However the authentication information is not limited to this example, and a PAN such as an account number or a credit card number, a card ID, or the like may be generated based on the biometric information, for example. That is, the authentication information may be information about an account or information about a credit card contract, for example. Also, the method for generating the authentication information based on the biometric information is not limited to the method described in the embodiments above, and another method may be adopted insofar as the same authentication information can be generated from the biometric information of the same person each time by the method.

In the second embodiment, a description has been given of an example in which the IC card 1a encrypts the card ID, the account number, and the PIN and outputs them to the external device 2a. However, it suffices if at least the PIN is encrypted, and encryption of the card ID and the account number is not necessarily executed.

In the third embodiment, a description has been given of an example in which the external device 2b does not perform PIN comparison. However, the external device 2b may perform PIN comparison depending on the type of the card that is used. If this is the case, the IC card 1b may transmit the PIN to the external device 2b, instead of the PIN comparison result. Also, although a description has been given of an example in which the external device 2, 2a, or 2c described above performs PIN comparison, the server device 25 that is connected thereto via the network NW may perform PIN comparison.

In the fourth embodiment, a description has been given of an example in which the IC card 1c includes the fingerprint sensor 11. However, any of the IC cards 1, 1a, 1b, 1d, and 1e according to the other embodiments may include the fingerprint sensor 11.

Also, in cases where the IC card 1b has the PIN authentication function as in the case of the third embodiment, the external device 2b may generate a PIN based on the fingerprint information, instead of the IC card 1b.

In the sixth and seventh embodiments, a description has been given of an example in which the IC card system 200e and the IC card system 200f respectively include a single registration device 26 and a single registration device 26a. However, each IC card system may include a plurality of registration devices 26 or a plurality of registration devices 26a. Also, the IC card system 200e may include a plurality of external devices 2.

In the embodiments, each of the IC cards 1 and 1a to 1e includes the EEPROM 8 as a rewritable non-volatile memory. However, the rewritable non-volatile memory is not limited to the EEPROM 8. For example, each of the IC cards 1 and 1a to 1e may include a flash EEPROM, a FeRAM (Ferroelectric Random Access Memory), or the like instead of the EEPROM 8.

In the embodiments, a description has been given of an example in which the IC cards 1 and 1a to 1e communicate with the external device 2, 2a, or 2b, the reader/writer device 24, or the registration device 26a via the contact unit 3. However, each IC card may be configured to communicate with the external device 2 via a contactless interfaces that uses a coil or the like.

In the fourth embodiment, the external device 2c may include the reader/writer device 24.

In the embodiments, a description has been given of an example in which the IC cards 1 and 1a are used as an example of a portable electronic device. However, the portable electronic device is not limited to an IC card. The portable electronic device may be an IC tag that does not have the shape of a card, or an electronic device that performs authentication of the user, such as a portable terminal.

According to at least one of the above-described embodiments, the IC card 1 has the fingerprint information obtaining unit 51 that obtains fingerprint information that represents a physical feature of a user, and the PIN generating unit 52 or 52a that generates a PIN that is numerical information having a predetermined number of digits and that is used for authentication of the user of the IC card 1, based on the fingerprint information that has been obtained by the fingerprint information obtaining unit 51. Therefore, the security of the IC card 1 can be improved.

The above-described embodiments can be expressed as follows.

A portable electronic device that includes a biometric information obtaining unit having an image capturing unit and configured to obtain biometric information that has been detected by a biometric information detecting unit configured to detect biometric information that represents a physical feature of a user based on an image that has been captured by the image capturing unit; and an authentication information generating unit configured to generate authentication information that is numerical information having a predetermined number of digits and that is used for authentication of the user, based on the biometric information that has been obtained by the biometric information obtaining unit.

The processes performed by each of the constituent elements included in the above-described IC card systems 200 and 200a to 200f may be achieved by recording a program that aims to realize the function of each of the constituent elements included in the above-described IC card systems 200 and 200a to 200f on a computer-readable recording medium and causing a computer system to read and execute the program that is recorded on the recording medium. Here, "causing a computer system to read and execute the program that is recorded on the recording medium" may include installing the program to the computer system. The "computer system" mentioned here may include an OS or hardware such as a peripheral device.

Also, "computer-readable recording medium" refers to a portable medium such as a flexible disk, a magneto-optical disc, a ROM, or a CD-ROM, or a storage device such as a hard disk that is built into the computer system.

While certain embodiments of the present invention have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A portable electronic device comprising:
a processor configured to:
obtain a command including fingerprint information of a user of the portable electronic device from an external device, wherein the command causes the portable electronic device to generate a Personal Identification Number (PIN), and the external device stores a first PIN generated beforehand based on fingerprint information of a legitimate user of the portable electronic device by a predetermined algorithm;
generate a second PIN, which is numeric information for authentication of the user of the portable electronic device and has a predetermined number of digits, based on the fingerprint information included in the command by the same algorithm as the predetermined algorithm for generating the first PIN each time when the command including fingerprint information is obtained by the portable electronic device;
include the second PIN generated in a response to the command; and
transmit the response to the external device.

2. The portable electronic device according to claim 1, wherein the processor is further configured to encrypt the second PIN generated and output the second PIN encrypted.

3. The portable electronic device according to claim 1, further comprising:
a communication interface through which the processor communicates with the external device.

4. An authentication system comprising:
a portable electronic device; and
an external device connected to the portable electronic device;
wherein the external device includes:
a storage in which a first Personal Identification Number (PIN) generated beforehand based on fingerprint information of a legitimate user of the portable electronic device by a predetermined algorithm has been stored,
a fingerprint sensor configured to detect fingerprint information of a user of the portable electronic device, and
a controller configured to include the fingerprint information of the user of the portable electronic device detected by the fingerprint sensor in a command, which causes the portable electronic device to generate a PIN, and transmit the command to the portable electronic device;
wherein the portable electronic device includes a processor configured to:
obtain the command, which causes the portable electronic device to generate the PIN, from the external device, the command including the fingerprint information of the user of the portable electronic device,
generate a second PIN, which is numeric information for authentication of the user of the portable electronic device and has a predetermined number of digits, based on the fingerprint information included in the command by the same algorithm as the predetermined algorithm for generating the first PIN each time when the command including fingerprint information is obtained by the portable electronic device,
include the second PIN generated in a response to the command; and
output the response to the external device; and
wherein the controller of the external device is further configured to authenticate the user of the portable electronic device by comparing the second PIN included in the response output from the portable electronic device with the first PIN stored in the storage.

5. The authentication system according to claim 4,
wherein the storage of the portable electronic device is further configured to store therein an ID number that is unique to the portable electronic device,
wherein the storage of the external device is further configured to store therein: the ID number that is unique to the portable electronic device in association with the first PIN,
wherein the processor of the portable electronic device is further configured to:
generate authentication information that includes: the ID number that is unique to the portable electronic device and that is stored in the storage of the portable electronic device; and the second PIN generated; and
output the authentication information to the external device, and
wherein the external device is further configured to:
extract the first PIN that is associated with the ID number that is stored in the storage of the external device based on the ID number that is included in the authentication information; and
compare the first PIN extracted with the second PIN that is included in the authentication information.

* * * * *